(12) United States Patent
De Corral

(10) Patent No.: US 11,913,919 B2
(45) Date of Patent: Feb. 27, 2024

(54) TECHNIQUES FOR ACQUISITION-STAGE PEAK WIDTH DETERMINATION AND BASELINE OFFSET ESTIMATION

(71) Applicant: WATERS TECHNOLOGIES IRELAND LIMITED, Dublin (IE)

(72) Inventor: Jose L. De Corral, Oceanside, CA (US)

(73) Assignee: WATERS TECHNOLOGIES IRELAND LIMITED, Dublin (IE)

( * ) Notice: Subject to any disclaimer, the term of this patent is extended or adjusted under 35 U.S.C. 154(b) by 449 days.

(21) Appl. No.: 17/186,540

(22) Filed: Feb. 26, 2021

(65) Prior Publication Data

US 2021/0262992 A1    Aug. 26, 2021

Related U.S. Application Data

(60) Provisional application No. 62/981,835, filed on Feb. 26, 2020.

(51) Int. Cl.
| | | |
|---|---|---|
| *G01N 30/72* | (2006.01) |
| *G01N 30/86* | (2006.01) |
| *G06F 18/00* | (2023.01) |
| *H01J 49/00* | (2006.01) |

(52) U.S. Cl.
CPC ......... *G01N 30/72* (2013.01); *G01N 30/8617* (2013.01); *G01N 30/8631* (2013.01); *G01N 30/8641* (2013.01); *G06F 18/00* (2023.01); *G06F 2218/00* (2023.01); *H01J 49/0036* (2013.01)

(58) Field of Classification Search
CPC .............. G01N 30/72; G01N 30/8617; G01N 30/8631; G01N 30/8641; G06F 18/00; G06F 2218/00

See application file for complete search history.

(56) References Cited

U.S. PATENT DOCUMENTS

| | | | |
|---|---|---|---|
| 2012/0158318 A1 | 6/2012 | Wright | |
| 2018/0259559 A1 | 9/2018 | Humphrey | |
| 2020/0264141 A1* | 8/2020 | Denny | ............... G01N 30/8617 |

FOREIGN PATENT DOCUMENTS

WO      2011155984 A1    12/2011

OTHER PUBLICATIONS

International Search Report and Written Opinion for International application No. PCT/IB2021/051635, dated May 21, 2021, 16 pages.

(Continued)

*Primary Examiner* — Mark R Gaworecki
(74) *Attorney, Agent, or Firm* — Goodwin Procter LLP

(57) ABSTRACT

Techniques and apparatus for an acquisition-stage peak width determination process are described. In one embodiment, for example, an apparatus may include at least one memory, and logic coupled to the at least one memory. The logic may be configured to implement an acquisition-stage peak width determination process operative to access acquisition-stage analytical information comprising at least one sequence of data points, determine a peak data point associated based on the peak data point meeting a plurality of acquisition-stage conditions, and determine the acquisition-stage peak width associated with the peak data point. Other embodiments are described.

30 Claims, 16 Drawing Sheets

(56) References Cited

OTHER PUBLICATIONS

Zhang, J., et al., "Review of Peak Detection Algorithms in Liquid Chromatography-Mass Spectrometry", Current Genomics, 10:388-401 (2009).
International Preliminary Report on Patentability for International Patent Application No. PCT/IB2021/051635, dated Sep. 9, 2022.

* cited by examiner

1300

```
┌─────────────────────────────────┐
│ COLLECT THE SEQUENCE OF POINTS  │
│ OF THE GAUSSIAN CURVE (PI) THAT │
│      CONTAINS THE TOP PART      │
│              1302               │
└─────────────────────────────────┘
                 │
                 ▼
┌─────────────────────────────────┐
│ COMPUTE THE AVERAGE OF THE TWO  │
│ END POINTS (FIRST AND LAST      │
│ POINTS) IN THE SEQUENCE (ENDY)  │
│              1304               │
└─────────────────────────────────┘
                 │
                 ▼
┌─────────────────────────────────┐
│  COMPUTE THE AMOUNT OF POSITIVE │
│     SHIFT REQUIRED (SHIFTY)     │
│              1306               │
└─────────────────────────────────┘
                 │
                 ▼
┌─────────────────────────────────┐
│  COMPUTE THE GAUSSIAN TOP PART  │
│   RATIO (RATIO) AS THE AVERAGE  │
│  VALUE OF THE SHIFTED POINTS    │
│  OVER THE SHIFTED PEAK APEX     │
│             VALUE               │
│              1308               │
└─────────────────────────────────┘
                 │
                 ▼
┌─────────────────────────────────┐
│  READ THE GAUSSIAN OFFSET RATIO │
│ (OFFSET) FROM THE TABLE OF      │
│ FINITE NUMBER OF OFFSET VALUES  │
│   USING THE COMPUTED RATIO      │
│             VALUE               │
│              1310               │
└─────────────────────────────────┘
                 │
                 ▼
┌─────────────────────────────────┐
│ COMPUTE THE ESTIMATED GAUSSIAN  │
│   CURVE OFFSET (PEAKOFFSET)     │
│              1312               │
└─────────────────────────────────┘
```

*FIG. 13*

TECHNIQUES FOR ACQUISITION-STAGE PEAK WIDTH DETERMINATION AND BASELINE OFFSET ESTIMATION

This application claims the benefit of and priority to U.S. Provisional Patent Application No. 62/981,835, filed on Feb. 26, 2020, the entire contents of which are incorporated by reference herein.

TECHNICAL FIELD

Embodiments herein generally relate to methods for mass analysis, and, more particularly, to techniques for generating peak width information in real-time or substantially real-time during acquisition of analytical information produced through analysis of a sample by a mass analyzer. In addition, embodiments herein generally relate to data processing techniques for baseline offset estimation.

BACKGROUND

Mass spectrometry (MS) analyses may generate mass spectral data that is typically stored in the form of mass spectrum graphs or plots. The mass spectrum may include peaks indicating the intensity of a corresponding ion. The accuracy of MS experiments depends on determining the peak width in each axis of the mass spectrum data (for example, retention time, mass-to-charge ratio (m/z), and/or drift time). In conventional system, the peak width is measured after the entire data has been acquired, during one of the first post-acquisition processing steps. MS data is typically large and requires long processing times. Accordingly, determining the peak width for each peak during a post-acquisition stage according to conventional techniques requires storage of large volumes of data as well as long processing times (on top of the time required to acquire the data).

SUMMARY

This Summary is provided to introduce a selection of concepts in a simplified form that is further described below in the Detailed Description. This Summary is not intended to necessarily identify key features or essential features of the claimed subject matter, nor is it intended as an aid in determining the scope of the claimed subject matter.

In accordance with various aspects of the described embodiments, an apparatus may include at least one memory, and logic coupled to the at least one memory, the logic to determine acquisition-stage peak width information. The logic may be operative to detect a plurality of acquisition-stage peaks and perform rough peak width estimation per peak, generate an estimated peak width per peak, and determine a final peak width based on the estimated peak width per peak.

In accordance with various aspects of the described embodiments, an apparatus may include at least one memory, and logic coupled to the at least one memory to implement an acquisition-stage peak width determination process operative to access acquisition-stage analytical information comprising at least one sequence of data points, determine a peak data point associated based on the peak data point meeting a plurality of acquisition-stage conditions, and determine the acquisition-stage peak width associated with the peak data point.

In some embodiments of the apparatus, the acquisition-stage analytical information may include multi-dimensional data, and the logic may implement the acquisition-stage peak width determination process separately on each dimension of the multi-dimensional data.

In various embodiments of the apparatus, the at least one sequence of data points may have a Gaussian profile. In some embodiments of the apparatus, the plurality of acquisition-stage conditions may include a first set of conditions to determine a peak apex and a second set of conditions to determine an estimation of full width at half maximum (FWHM).

In various embodiments of the apparatus, the plurality of acquisition-stage conditions may include the following:

$P_C >$ Intensity$_{min}$, $P_H > P_{L-1}$, $P_L > P_{H+1}$, $2P_L < P_C$, $2P_H < P_C$, $2P_{L+1} \geq P_C$, and $2P_{H-1} \geq P_C$, wherein $P_C$ is the intensity at the center point of a subset of the at least one sequence of data points, $P_L$ is the intensity at the first or lowest point of said subset, $P_H$ is the intensity at the last or highest point of said subset, $P_{L+1}$ is the intensity at the point immediately after point $P_L$, $P_{H-1}$ is the intensity at the point immediately before point $P_H$, and Intensity$_{min}$ is a minimum intensity threshold.

In exemplary embodiments of the apparatus, the logic may operate to filter the at least one sequence of data points using a box filter process. In some embodiments of the apparatus, the logic may operate to determine a filtered sequence of data points during filtering of the at least one sequence of data points. In some embodiments of the apparatus, the logic may operate to determine at least one peak width estimation per peak based on the filtered sequence of data points. In exemplary embodiments of the apparatus, the logic may operate to determine the at least one peak width estimation by generating a best-fit Gaussian curve for the filtered sequence of data points and estimating the peak width as the full width at half maximum (FWHM) of the best-fit Gaussian curve. In some embodiments of the apparatus, the logic may operate to determine an output peak width based on the at least one peak width estimation. In various embodiments of the apparatus, the logic may operate to determine the output peak width based on the mean, median, or mode of a plurality of peak widths. In some embodiments of the apparatus, the plurality of peak widths may include at least one of peaks accumulated at a specified point during acquisition, most intense peaks, or most recent peaks.

In accordance with various aspects of the described embodiments, a method to implement an acquisition-stage peak width determination process may include accessing acquisition-stage analytical information comprising at least one sequence of data points, determining a peak data point associated based on the peak data point meeting a plurality of acquisition-stage conditions, and determining the acquisition-stage peak width associated with the peak data point.

In some embodiments of the method, the acquisition-stage analytical information may include multi-dimensional data, the logic to implement the acquisition-stage peak width determination process separately on each dimension of the multi-dimensional data. In various embodiments of the method, the at least one sequence of data points may have a Gaussian profile. In some embodiments of the method, the plurality of acquisition-stage conditions may include a first set of conditions to determine a peak apex and a second set of conditions to determine an estimation of full width at half maximum (FWHM).

In various embodiments of the method, the plurality of acquisition-stage conditions may include the following:

$P_C > \text{Intensity}_{min}$, $P_H > P_{L-1}$, $P_L > P_{H+1}$, $2P_L < P_C$, $2P_H < P_C$, $2P_{L+1} \geq P_C$, and $2P_{H-1} \geq P_C$, wherein $P_C$ is the intensity at the center point of a subset of the at least one sequence of data points, $P_L$ is the intensity at the first or lowest point of said subset, $P_H$ is the intensity at the last or highest point of said subset, $P_{L+1}$ is the intensity at the point immediately after point $P_L$, $P_{H-1}$ is the intensity at the point immediately before point $P_H$, and $\text{Intensity}_{min}$ is a minimum intensity threshold.

In exemplary embodiments of the method, the method may include filtering the at least one sequence of data points using a box filter process. In some embodiments of the method, the method may include determining a filtered sequence of data points during filtering of the at least one sequence of data points. In various embodiments of the method, the method may include determining at least one peak width estimation per peak based on the filtered sequence of data points. In some embodiments of the method, the method may include determining the at least one the peak width estimation by generating a best-fit Gaussian curve for the filtered sequence of data points and estimating the peak width as the full width at half maximum (FWHM) of the best-fit Gaussian curve. In exemplary embodiments of the method, the method may include determining an output peak width based on the at least one peak width estimation. In some embodiments of the method, the method may include determining the output peak width based on the mean, median, or mode of a plurality of peak widths. In various embodiments of the method, the plurality of peak widths may include at least one of peaks accumulated at a specified point during acquisition, most intense peaks, or most recent peaks.

In some embodiments of the apparatus, the logic may be operative to determine the peak offset intensity based on the Gaussian offset ratio value offset the apex intensity according to the following:

$$peakOffset = \text{offset} \cdot \frac{peakY}{\text{offset} + 1}.$$

In some embodiments of the apparatus, the logic may be operative to determine an intensity shift value shiftY to add to each of the sequence of data points, determine the Gaussian top-part ratio value based on an average intensity of the sequence of shifted data points over the shifted apex intensity, determine the peak offset intensity based on the Gaussian offset ratio value offset, the apex intensity, and the intensity shift value according to the following:

$$peakOffset = \text{offset} \cdot \frac{peakY + shiftY}{\text{offset} + 1} - shiftY.$$

In some embodiments of the apparatus, the logic may determine the intensity shift value via including in the sequence of N data points at least two endpoints having an intensity below half the apex intensity, wherein the two end points occupy the first and last positions in the sequence of N data points and have an average intensity endY, determining a positive intensity shift value based on an average of at least two shifted endpoints being equal to half a shifted apex intensity according to the following:

shiftY=peakY−2·endY.

In some embodiments of the apparatus, the logic may be operative to determine the Gaussian offset ratio from the Gaussian top-part ratio based on the inverse of the following:

$$ratio = \frac{\frac{\sqrt{\pi}}{2} \cdot \frac{erf\left(\sqrt{-\ln\left(\frac{1 - \text{offset}}{2}\right)}\right)}{\sqrt{-\ln\left(\frac{1 - \text{offset}}{2}\right)}} + \text{offset}}{1 + \text{offset}}.$$

In accordance with various aspects of the described embodiments, an apparatus may include at least one memory and logic coupled to the at least one memory. The logic may implement a baseline offset estimation process operative to determine a Gaussian curve having an apex intensity peakY that equals a Gaussian intensity plus a peak offset intensity peakOffset, determine a sequence of N data points of the Gaussian curve, that may include an apex point and adjacent points with an intensity greater than or equal to half the apex intensity, determine a table of a plurality of Gaussian top-part ratio values, wherein each of the plurality of Gaussian top-part ratio values corresponds with a Gaussian offset ratio value, determine a Gaussian top-part ratio value based on an average intensity of the sequence of N data points over the apex intensity, determine a Gaussian offset ratio value based on the Gaussian top-part ratio value and the table

BRIEF DESCRIPTION OF THE DRAWINGS

FIG. 13. illustrates a baseline offset estimation logic flow

DETAILED DESCRIPTION

Figure 1:
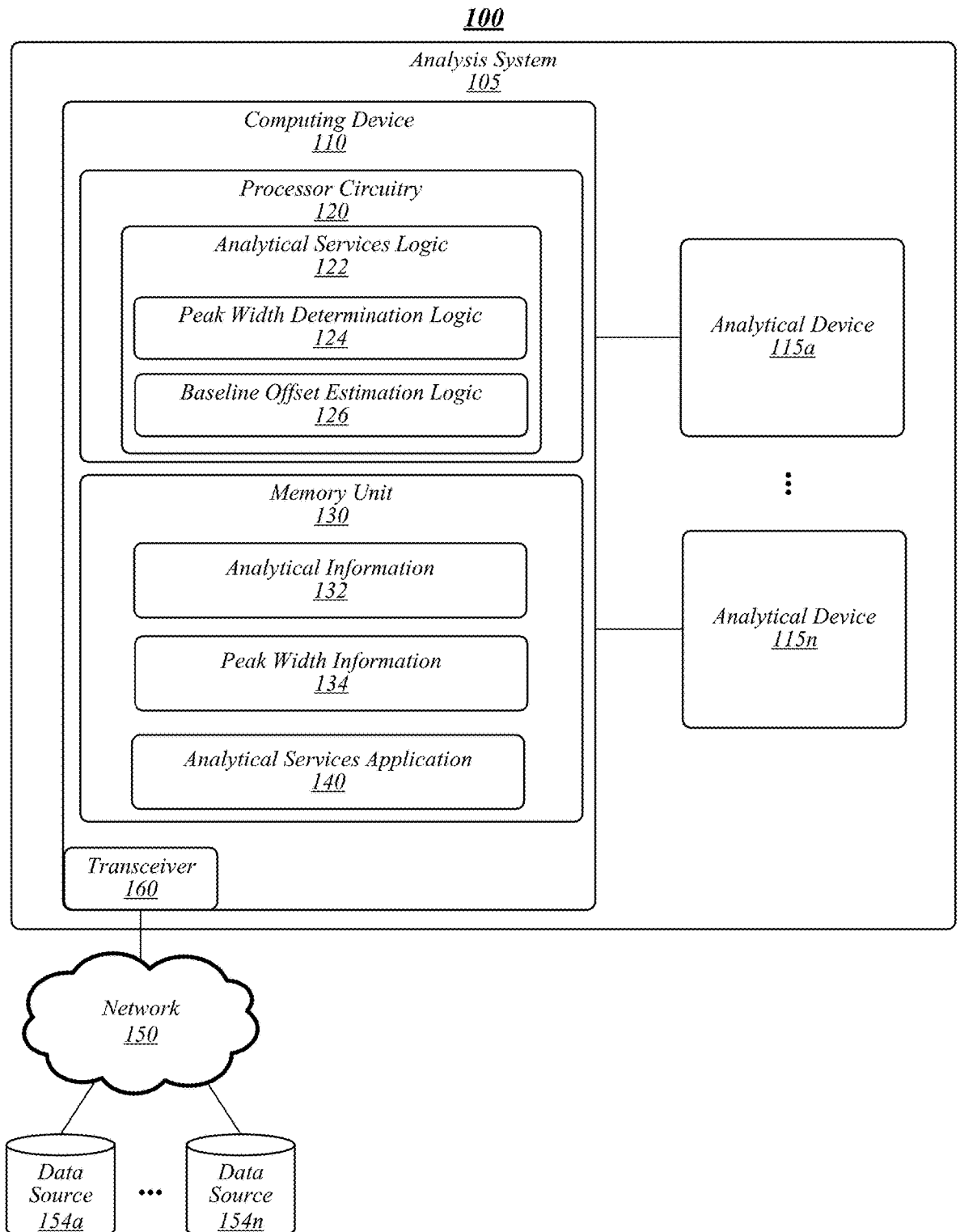
FIG. 1 illustrates an embodiment of a first operating environment.

Various embodiments may generally be directed toward systems, methods, and/or apparatus for determining peak width information during an acquisition stage of a mass analysis process. In general, peak width information may include determining a peak width and/or a peak width estimation of a peak of a mass spectrum. An acquisition stage may include real-time or substantially real-time generation of analytical information (for instance, raw data, mass spectrum, and/or the like) by an analytical device during performance of mass analysis method.

In conventional systems, the peak width is measured after the entire data has been acquired, during one of the first post-acquisition processing steps. However, to save time in post-acquisition processing, as well as reducing the size of data storage, it is desired to do real-time processing during data acquisition. One conventional method requires prior knowledge of peak width values before acquisition starts. Another conventional method involves acquiring the first data sample in a set to compute peak width (which still requires time and processing resources for the first sample acquisition). However, such a method assumes that all samples in a data set depend on the same peak width, which may not provide accurate results in many cases. In addition, if a sample is not part of a corresponding set with known/determined peak width values, such methods may not work.

Accordingly, some embodiments may include an acquisition-stage peak width determination process operative to determine in real-time the peak width in one-dimensional or multi-dimensional data. For example, in some embodiments, an acquisition-stage peak width determination process may determine the full width at half maximum (FWHM) of Gaussian peaks in one dimension for one-dimensional data (for instance, a chromatogram, a mass spectrometry spectrum, a driftogram, and/or other one-dimensional data streams). In various embodiments, for multi-dimensional data, the acquisition-stage peak width determination process may compute the peak width in each axis independently. For example, for liquid chromatography/ion mobility spectrometry/mass spectrometry (LC/IMS/MS), data is three-dimensional and the peak width can be computed in the chromatographic axis, the mass axis, and the drift axis separately, using the acquisition-stage peak width determination process according to some embodiments. More specifically, because the acquisition-stage peak width determination process is generic because it can be used in any sequence of data points of varying intensity regardless of the sampling unit (for instance, minutes, AMUs, drift bins, and/or the like), it can be used in each axis of multi-dimensional data.

Acquisition-stage peak width determination processes according to some embodiments may provide multiple technological advantages, including improvements to computing technology, over conventional systems and methods. For instance, some embodiments may allow for real-time processing of mass analysis information, such as MS and/or IMS analytical information. In another instance, some embodiments may determine peak width information in real-time that is specific for each sample. For example, a computed real-time peak width may not necessarily be a constant value; rather, it may evolve with the acquisition, matching the actual peak width at any given time during the data acquisition stage. An acquisition-stage peak width determination process according to some embodiments may actually provide a real-time peak width determination, because it is capable of consuming data and generating results at a pace faster than the acquisition rate. For example, the acquisition-stage peak width determination process may operate using fast and simple computations running in a parallel processor, for instance, a graphical processing unit (GPU).

Some embodiments may include a baseline offset estimation process operative to determine an estimated baseline offset for a fitted curve. In various embodiments, the fitted curve may include a Gaussian curve. In some embodiments, the baseline offset estimation process may be used for determining a peak width and/or a peak width estimation of a peak of a mass spectrum according to various embodiments. For example, the baseline offset estimation process may be executed before determining a peak width estimation to supply an estimated baseline offset to the Gaussian curve fitting method used to determine the peak width estimation.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include an analysis system 105 operative to manage analytical data associated with analytical devices 115a-n. In some embodiments, analytical devices 115a-n may be or may include a chromatography system, a liquid chromatography (LC) system, a gas chromatography (GC) system, a mass analyzer system, a mass spectrometer (MS) system, an ion mobility spectrometer (IMS) system, a high-performance liquid chromatography (HPLC) system, a ultra-performance liquid chromatography (UPLC®) system, a ultra-high performance liquid chromatography (UHPLC) system, a solid-phase extraction system, a sample preparation system, a heater (for example, a column heater), a sample manager, a solvent manager, an in vitro device (IVD), combinations thereof, components thereof, variations thereof, and/or the like. Although LC, IMS, MS, and combinations thereof are used in examples in this detailed description, embodiments are not so limited, as other analytical devices capable of operating according to some embodiments are contemplated herein.

In various embodiments, analysis system 105 may include computing device 110 communicatively coupled to analytical devices 115a-n. Computing device 110 may be operative to communicate with, control, monitor, manage, or otherwise process various operational functions of analytical devices 115a-n. In other embodiments, computing device 110 may not be communicatively coupled to analytical devices 115a-n. Computing device 110 may obtain analytical information 132 directly from data sources 154a-n and/or directly from analytical devices 115a-n. In some embodiments, computing device 110 may be or may include a standalone computing device, such as a personal computer (PC), server, tablet computing device, cloud computing device, and/or the like. In some embodiments, computing device 110 may be a separate device from analytical devices 115a-n. In other embodiments, computing device 110 may be a part, such as an integrated controller, of analytical devices 115a-n. In various embodiments, computing device 110 may be operative to receive, access, or otherwise obtain analytical information 132 in real-time or substantially real-time during an acquisition stage of an analysis performed via one or more of analytical devices 115a-n.

As shown in FIG. 1, computing device 110 may include processing circuitry 120, a memory unit 130, and a transceiver 160. Processing circuitry 120 may be communicatively coupled to memory unit 130 and/or transceiver 160.

Processing circuitry 120 may include and/or may access various logic for performing processes according to some embodiments. For instance, processing circuitry 120 may include and/or may access analytical services logic 122, peak width determination logic 124, and/or baseline offset estimation logic 126. Processing circuitry 120, analytical services logic 122, peak width determination logic 124, and/or baseline offset estimation logic 126, or portions thereof, may be implemented in hardware, software, or a combination thereof. As used in this application, the terms "logic," "component," "layer," "system," "circuitry," "decoder," "encoder," and/or "module" are intended to refer to a computer-related entity, either hardware, a combination of hardware and software, software, or software in execution, examples of which are provided by the exemplary computing architecture 1500. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

In various embodiments, processing circuitry 120 may be or may include one or more graphical processing units (GPU). For example, an acquisition-stage peak width determination process according to some embodiments may be configured to run in a GPU, for instance, programmed using the Compute Unified Device Architecture (CUDA) programming language developed by NVIDIA® Corporation or another GPU parallel computing platform. Embodiments are not limited in this context.

Although analytical services logic 122 is depicted in FIG. 1 as being within processing circuitry 120, embodiments are not so limited. In addition, although peak width determination logic 124 and baseline offset estimation logic 126 are depicted as being a logic of analytical services logic 122, embodiments are not so limited, as peak width determination logic 124 and/or baseline offset estimation logic 126 may be a separate logic and/or may not be a standalone logics but, rather, a part of analytical services logic 122. For example, analytical services logic 122, and/or any component thereof, may be located within an accelerator, a processor core, an interface, an individual processor die, implemented entirely as a software application (for instance, analytical services application 140) and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 130 may store an analytical services application 140 that may operate, alone or in combination with analytical services logic 122, to perform various analytical functions according to some embodiments. In various embodiments, analytical services application 140 may interact with analytical devices 115a-n and/or components thereof through various drivers (which may include application programming interfaces (APIs) and/or the like).

Figure 2:
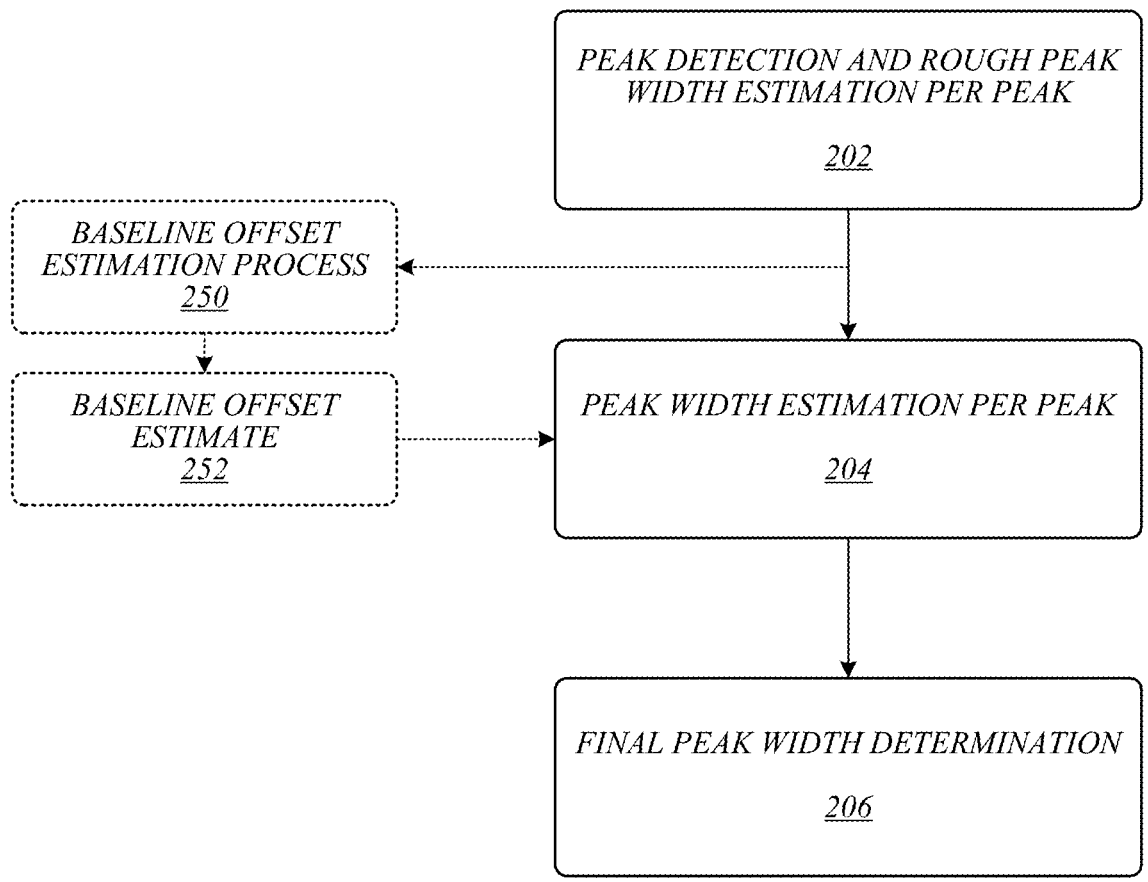
FIG. 2 illustrates a first logic flow according to some embodiments.

In various embodiments, peak width determination logic 124 may, for example, via analytical services application 140, implement an acquisition-stage peak width determination process to generate peak width information 134. FIG. 2 illustrates an embodiment of a logic flow 200. Logic flow 200 may be representative of some or all of the operations executed by one or more embodiments described herein, such as computing device 110. In some embodiments, logic flow 200 may be representative of some or all of the operations of an acquisition-stage peak width determination process performed via peak width determination logic 124.

Figure 3:
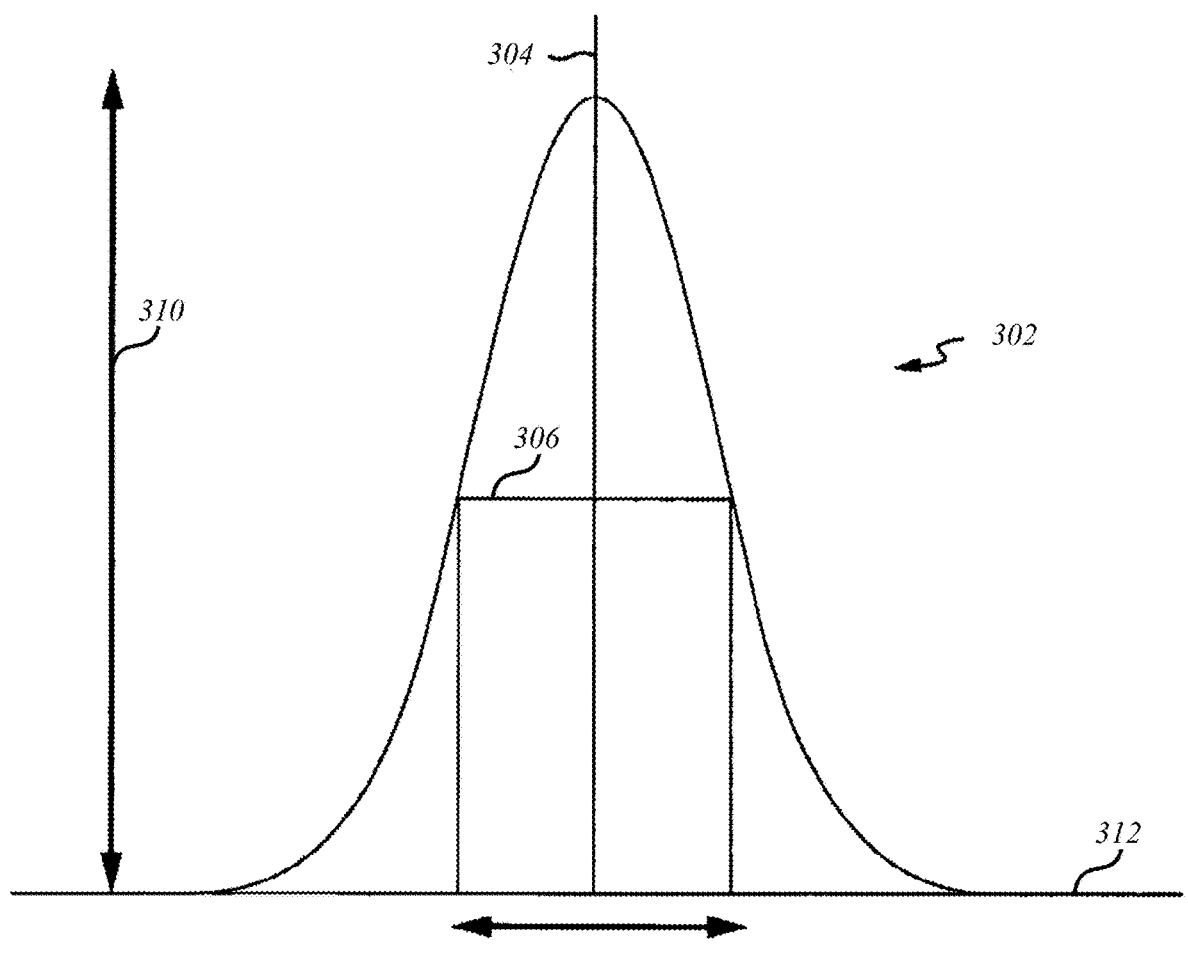
FIG. 3 illustrates an exemplary mass spectrum peak.

At block 202, logic flow 200 may perform acquisition-stage peak detection and rough peak width determination per peak. FIG. 3 illustrates an exemplary mass spectrum peak 302 having a peak apex 304, peak height 310 (for example, intensity), and FWHM 306. X-axis 312 may indicate retention time, m/z, drift time, and/or the like. In various embodiments, peaks may be assumed to have a Gaussian profile, for example, as shown in FIG. 3. For instance, for a Gaussian profile, the FWHM may be approximately 2.35 times the standard deviation σ of the Gaussian profile.

Given a sequence of data points acquired at a certain rate, logic flow 200 at block 202 may perform an acquisition-stage peak detection process that also provides a rough estimate of the FWHM of each detected peak. In some embodiments, the sequence of data points may be analytical information in the form of a chromatogram, a mass spectrum, a driftogram, or any other sequence. In various embodiments, to find a peak in the sequence of data points involves determining its apex by searching for local maxima in the sequence. For example, by testing each and every point in the sequence and finding data points with intensity greater than the previous and next points, as shown below for point $P_i$, which also must have an intensity above a set minimum:

$P_i > \text{Intensity}_{min}$ $P_i > P_{i-1}$ $P_i > P_{i+1}$

Due to the noise normally present in the data, the number of local maxima found could be much greater than the actual number of peak apices. Accordingly, in some embodiments, the data may be filtered to reduce the effect of the noise. A non-limiting example of a filter may include a convolutional filter. Another non-limiting example of a filter, which may be less computationally expensive than a convolution filter, may be a simple box filter of N elements that only requires two operations per data point to update the box filter accumulated sum. For example, for N=5, point $P_i$ is replaced by $FP_i$ that corresponds to the box filter sum centered at $P_i$:

$P_i \rightarrow FP_i = (P_{i-2} + P_{i-1} + P_i + P_{i+1} + P_{i+2})$.

For point $P_{i+1}$ only one value changes in the box filter accumulated sum, which may involve only two operations, one subtraction and one addition:

$P_{i+i} \rightarrow FP_{i+1} = (P_{i-1} + P_i + P_{i+1} + P_{i+2} + P_{i+3})$

In some embodiments, each point $P_i$ may be replaced by the average value of those in the accumulated sum ($FP_i/N$). However, for use of this filter according to some embodiments, working with the sum values is equally valid and a division operation may be avoided.

Working with filtered data, local maxima may be found the same way for point $FP_i$ according to the following:

$P_i > \text{Intensity}_{min}$ $FP_i > FP_{i-1}$ $FP_i > FP_{i+i}$.

Using the same box filter example with N=5, the previous sequence can be replaced with $P_i > \text{Intensity}_{min}$ $(P_{i-2} + P_{i-1} + P_i + P_{i+1} + P_{i+2}) > (P_{i-3} + P_{i-2} + P_{i-1} + P_i + P_{i+1})$ $(P_{i-2} + P_{i-1} + P_i + P_{i+1} + P_{i+2}) > (P_{i-1} + P_i + P_{i+1} + P_{i+2} P_{i+3})$, which may be equivalent to the following:

$P_i > \text{Intensity}_{min}$ $P_{i+2} > P_{i-3}$ $P_{i-2} > P_{i+3}$.

If a peak apex is detected at $P_i$ and the FWHM of the peak is slightly narrower than the box of the filter, the intensity at the two end points in the box should be smaller than half the intensity at the apex, and the intensity at the adjacent points should not be smaller than half the intensity at the apex as expressed in the following four conditions.

If these four conditions are met, the FHWM of the peak may be determined to be about the width of the filter box.

$P_{i-2} < P_i/2$ $P_{i+2} < P_i/2$ $P_{i-1} \geq P_i/2$ $P_{i+1} \geq P_i/2$.

In this example, the rough peak width may be 4 (N−1) because it is the distance between the first and last point in the box.

Alternately, the box may contain more data points if the threshold is sent in these four conditions lower than $P_i/2$, for example, setting the threshold to $P_i/3$. However, this makes some data points to have intensity closer to the baseline of the Gaussian, and using these points in the following step may lead to greater error in the estimated peak width due to noise. In addition, if the peak has a tail, adding more points to the computation may also contribute to error in the estimated peak width.

Figure 4:
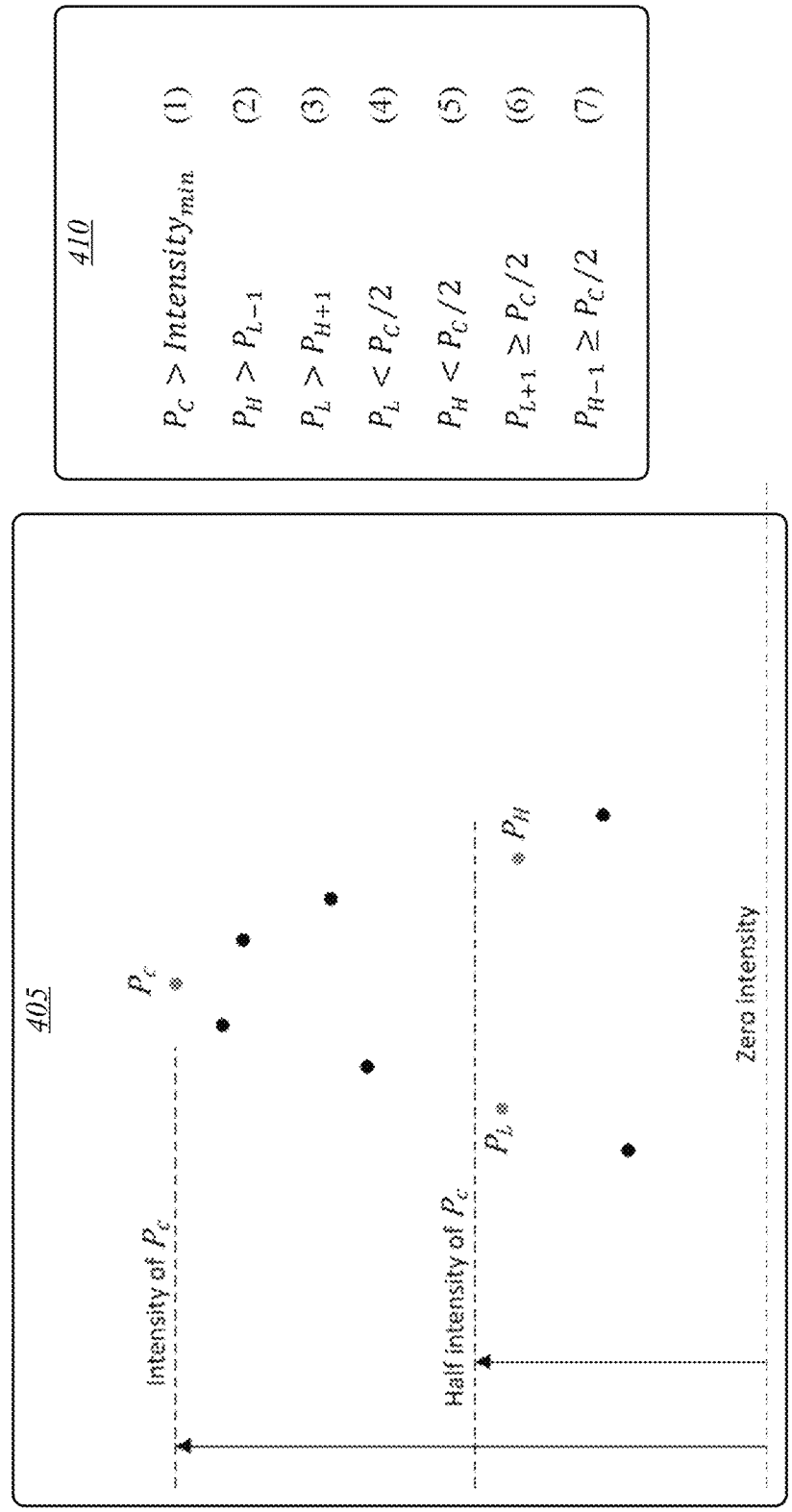
FIG. 4 illustrates an exemplary set of data points and condition set for an acquisition-stage peak detection process according to some embodiments.

FIG. 4 illustrates a first embodiment of an acquisition-stage peak detection process. More specifically, FIG. 4 depicts a sequence of data points 405 (or "box" or "filter box"), which represent a subset of the entire sequence of data points acquired, and a condition set 410 (the "seven conditions" or "acquisition-stage peak detection conditions"). In some embodiments, for each data point in the sequence of data points acquired, the conditions 410 are tested to determine the presence of a peak with a certain width. If all conditions 410 pass, that point and certain of the point's neighbor points are passed to the next processing step, otherwise, the process moves to the next data point.

Using generic labels to describe an arbitrary filter box length, the seven conditions 410 can be expressed as follows: $P_C$ is the intensity at the center point in the box, $P_L$ is the intensity at the lowest point in the box, and $P_H$ is the intensity at the highest point in the box. Conditions (2) and (3) detect a peak apex, and conditions (4) through (7) determine a rough estimation of the peak's FWHM. These seven conditions or comparisons are all that are required by the acquisition-stage peak width determination process to find peaks and their rough width in the sequence of data points.

Figure 6A:
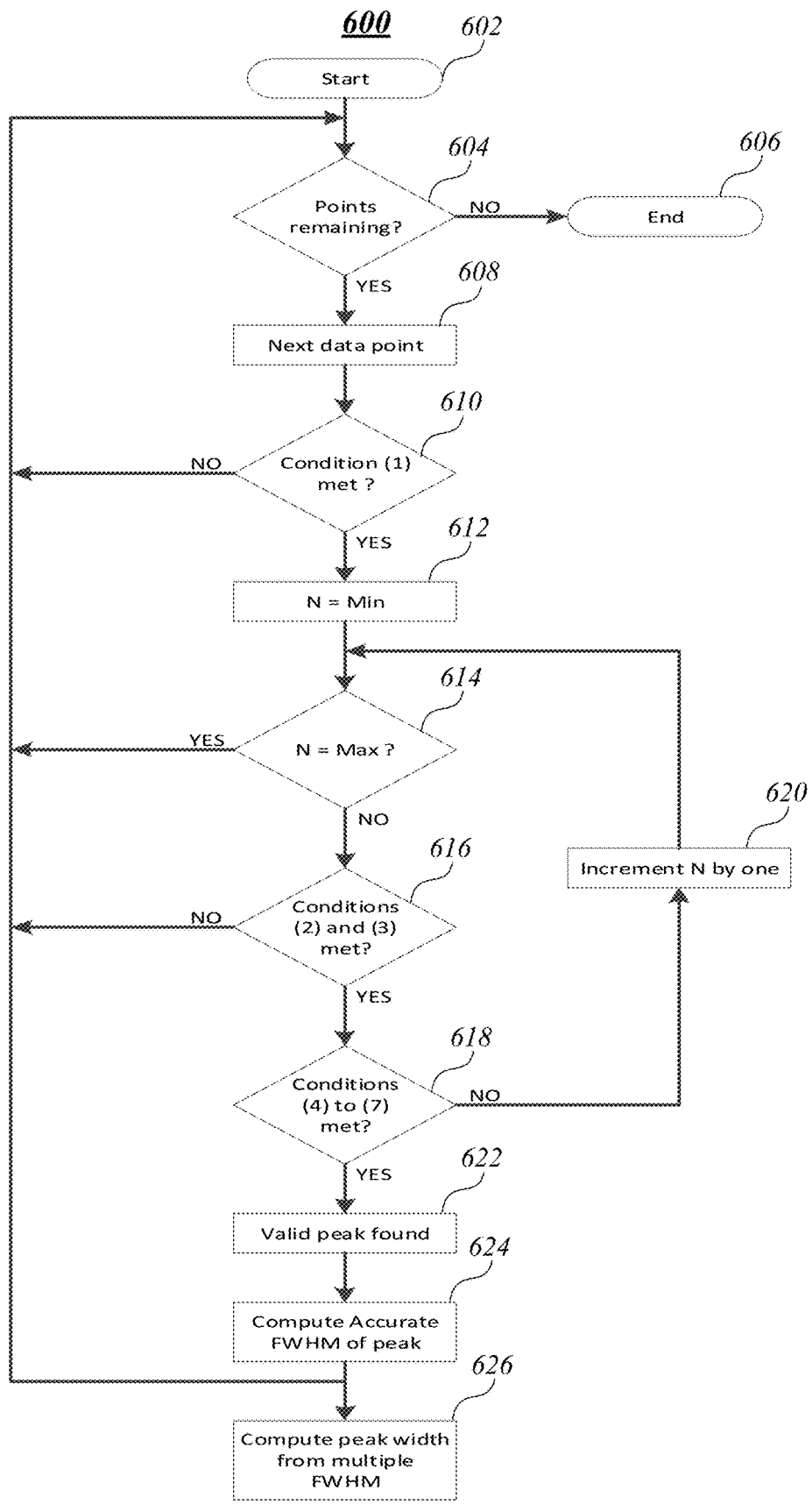
FIG. 6A illustrates a logic flow according to some embodiments.

FIG. 6A illustrates an embodiment of a logic flow 600. Logic flow 600 may be representative of some or all of the operations executed by one or more embodiments described herein, such as computing device 110. In some embodiments, logic flow 600 may be representative of some or all of the operations of an acquisition-stage peak width determination process performing operations to implement blocks 202, 204, and 206 of logic flow 200.

At block 602, logic flow 600 may start an acquisition-stage peak detection and width determination by determining whether data points remain to be analyzed at block 604. If there are no more points to be analyzed, logic flow 600 may end 606. If there are points to be analyzed, logic flow 600 may access the next data point at block 608. Accordingly, for each data point in the sequence (for example, data points 405), logic flow 600 may first check if condition (1)

is met at block 610. At blocks 612 and 614, logic flow 600 may then check increasing values of N from a minimum value to a maximum value, testing the other six conditions. If conditions (2) and (3) are met at block 616 but not conditions (4) to (7) at block 618, logic flow 600 may increase N by one at block 620 and test again until all six conditions are met by returning to block 614.

If at a certain value of N, conditions (2) and (3) are no longer met, or if all six conditions are never met for any N, logic flow 600 may move to the next data point. When the value of N is even, there is one more point at the high end of the box than at the low end. In this case there are two central points in the box, and $P_C$ is the lower of the two. However, the intensity assigned to $P_C$ is the maximum of the two central points.

Once all seven conditions are met as determined by logic flow 600 via blocks 616 and 618, a valid peak may be found at block 622 and all points in the box ("short sequence," "short set", "filtered set," or "filtered sequence") are used in computing FWHM of peak at block 624 (process performed by block 204 of logic flow 200) and/or computing peak width from multiple FWHM at block 626 (for example, process performed by block 206 of logic flow 200).

Figure 6B:
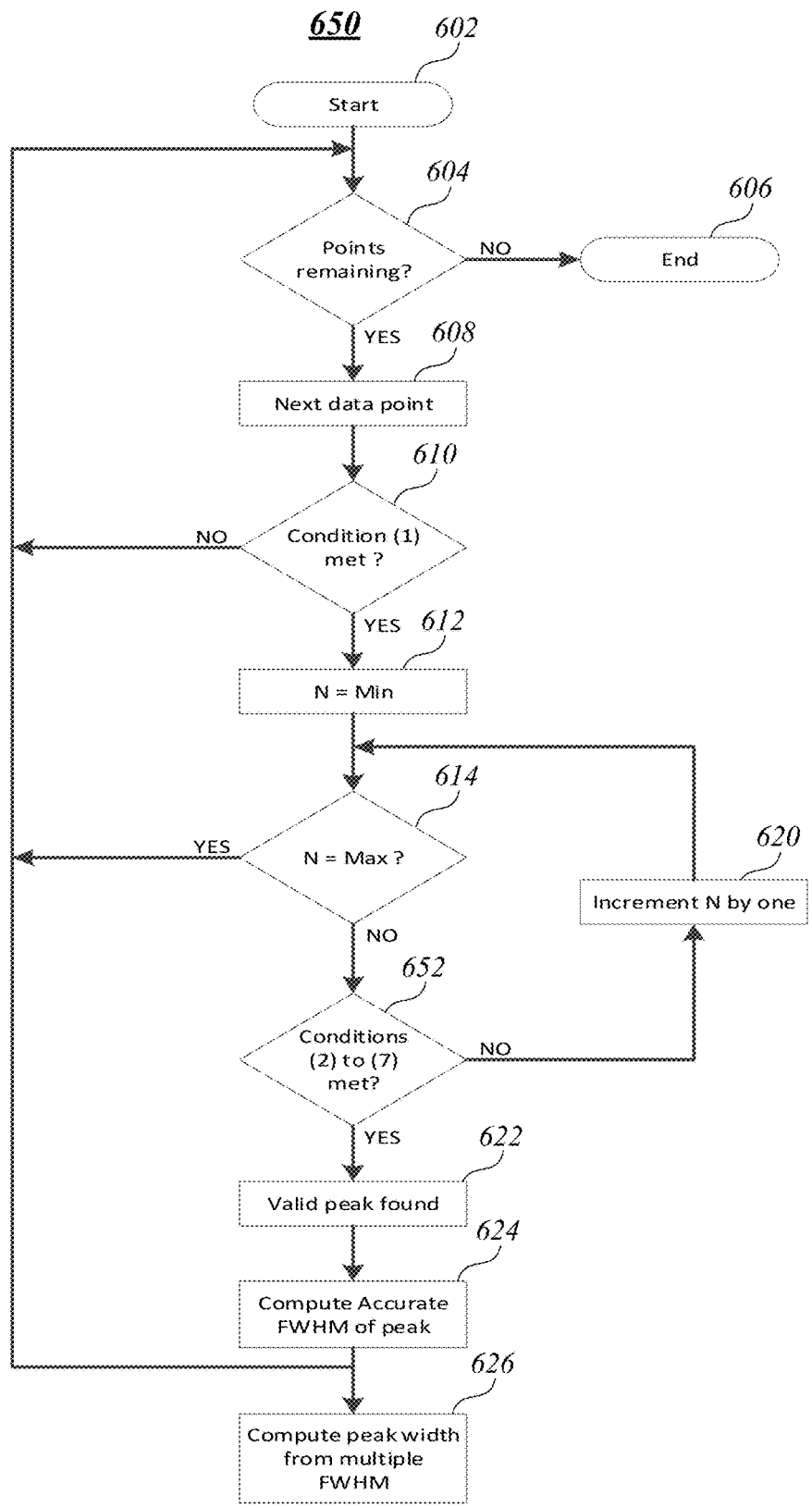
FIG. 6B illustrates a second logic flow according to some embodiments.

FIG. 6B illustrates an embodiment of a logic flow 650. Logic flow 650 may be representative of some or all of the operations executed by one or more embodiments described herein, such as computing device 110. In some embodiments, logic flow 650 may be representative of some or all of the operations of an acquisition-stage peak width determination process performing operations to implement blocks 202, 204, and 206 of logic flow 200.

In some configurations, logic flow 600 may lead to early rejection of detected peaks due to noise in the data. For example, when N is small there might be peaks that are rejected due to conditions (2) and (3) not being met, despite these conditions being met later with a wider N. These peaks could have even succeeded as valid peaks if all seven conditions (1)-(7) were to be met eventually. With logic flow 600, these peaks may be skipped due to early rejection (for instance, in the case of a small N), and they may not be taken into consideration to compute the peak width, which may lead to a substantial reduction in the number of peaks used to compute the peak width.

Accordingly, in some embodiments, logic flow 650 of FIG. 6B may be used. As shown in FIG. 6B, for each data point in the sequence, logic flow 650 may first check if condition (1) is met at block 610. Then logic flow 650 may check increasing values of N from a minimum value to a maximum value, testing the other six conditions at block 652. If any of these six conditions are not met, increase N by one at block 620 and test again until all six conditions are met. Logic flow 650 may move to the next data point if all six conditions are never met for any N.

Figure 5:
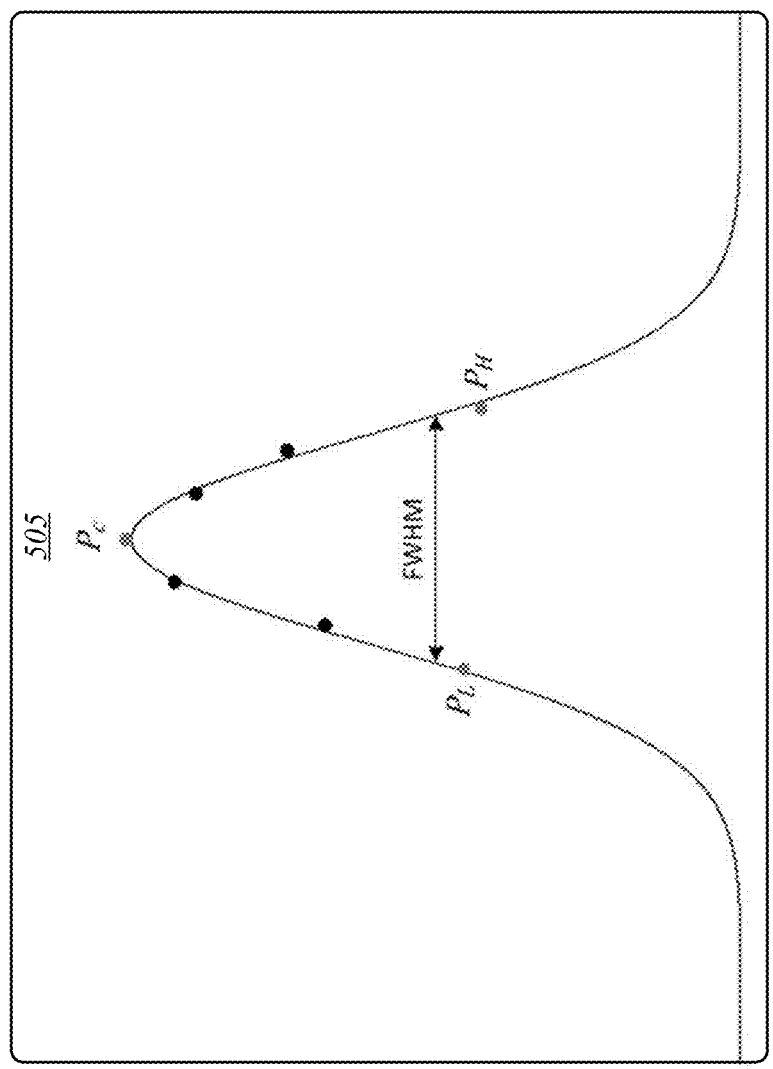
FIG. 5 illustrates an exemplary set of data points for an acquisition-stage peak detection process according to some embodiments.

Referring to FIG. 2, logic flow 200 may determine a peak width determination per peak at block 204. FIG. 5 illustrates a set of data points according to an embodiment of an acquisition-stage peak detection process (for instance, a "short set" or "filtered set" of data points resulting from filtering during block 202). More specifically, FIG. 5 may illustrate a Gaussian curve that best fits the sequence of data points depicted in FIG. 4.

In some embodiments, the peak width of the valid peak determined in block 202 may be estimated using all data points contained in box 505 of FIG. 5. In some embodiments, using the short sequence of data points determined in block 202 (for instance, box 505), block 204 of logic flow 200 may determine the Gaussian curve that best fits the data points. The peak width may be the FWHM of the computed Gaussian curve. In various embodiments, each peak width may be saved for use in block 206 of logic flow 200. The sequence of intensities of the points (for example, box 505) may represent the top half of a Gaussian peak, for instance, the intensity of the first point may be slightly lower than the peak's FWHM, the intensity of the following points increase towards the peak apex intensity occurring at some point around the middle, and the intensity of the following points decrease towards the last point intensity, which may be also slightly lower than the peak's FWHM.

Given this sequence of points, logic flow 200 at block 204 may find the Gaussian curve that best fits these points. Once the Gaussian is computed, the FWHM of the Gaussian may be assigned to the peak. In some embodiments, a standard Gaussian fit may be used, for example, based on taking the natural log of the intensity values and using a quadratic fit on those values.

For example, a Gaussian function and its natural log:

$$y = Y_{apex} \cdot e^{\left[-\frac{(x-X_{apex})^2}{2 \cdot \sigma^2}\right]} \quad \ln(y) = \ln(Y_{apex}) - \frac{(x-X_{apex})^2}{2 \cdot \sigma^2}.$$

The log expression can be arranged as a second order polynomial:

$$\ln(y) = A + B \cdot x + C \cdot x^2,$$

with the following coefficients:

$$A = \ln(Y_{apex}) - \frac{X_{apex}^2}{2 \cdot \sigma^2}, \quad B = \frac{X_{apex}}{\sigma^2}, \quad C = \frac{-1}{2 \cdot \sigma^2}.$$

The three coefficients A, B, and C may be computed from the data points in the box, and the parameters of the Gaussian curve fitting may be computed from the coefficients as follows:

$$\sigma = \frac{1}{\sqrt{-2 \cdot C}} \quad X_{apex} = \frac{-B}{2 \cdot C} \quad Y_{apex} = e^{\left(A - \frac{B^2}{4 \cdot C}\right)}$$

Any quadratic curve fitting method may be used to compute the coefficients A, B, and C from the data points, such as the following set of standard quadratic fit equations. For example, first, a series of summation terms are computed using all data points:

$$sumx = \Sigma x_i \quad sumx2 = \Sigma x_i^2 \quad sumx3 = \Sigma x_i^3 \quad sumx4 = \Sigma x_i^4$$

$$sumy = \Sigma \ln(y_i) \quad sumxy = \Sigma x_i \cdot \ln(y_i) \quad sumx2y = \Sigma x_i^2 \cdot \ln(y_i).$$

Then, coefficients A, B, and C may be computed from the summation terms as follows, where N is the number of points in the box:

$$denom = sumx2 \cdot (2 \cdot sumx \cdot sumx3 + N \cdot sumx4 - sumx2^2) -$$
$$N \cdot sumx3^2 - sumx4 \cdot sumx^2$$

$$A = \frac{sumx2 \cdot (sumx4 \cdot sumy + sumx3 \cdot sumxy - sumx2 \cdot sumx2y) + sumx3 \cdot (sumx \cdot sumx2y - sumx3 \cdot sumy) - sumx \cdot sumxy \cdot sumx4}{denom}$$

-continued $$B = \frac{\begin{array}{c}sumx2 \cdot (sumx \cdot sumx2y + sumx3 \cdot sumy - sumx2 \cdot sumxy) + \\ sumx4 \cdot (N \cdot sumxy - sumx \cdot sumy) - N \cdot sumx2y \cdot sumx3\end{array}}{denom}$$

$$C = \frac{\begin{array}{c}sumx2 \cdot (N \cdot sumx2y + sumx \cdot sumxy - sumx2 \cdot sumy) + \\ sumx \cdot (sumx3 \cdot sumy - sumx \cdot sumx2y) - N \cdot sumxy \cdot sumx3\end{array}}{denom}$$

Although the following set of quadratic fit equations have been used as an exemplary technique to determine coefficients A, B, and C, embodiments are not so limited as other methods that achieve the same result may be used according to various embodiments.

In some embodiments, only coefficient C may be used to compute the Gaussian σ as shown above, but all three coefficients may be used if the position and intensity of the Gaussian apex are also needed. Once the Gaussian σ is computed, the FWHM of the peak may be computed according to the following:

FWHM=σ·2·√2·ln(2).

The computed FWHM of the peak may be saved in an array (for instance, an array of FWHM values) or other data structure to be used in the next step (for instance, block 206, for example, preferably containing several FWHM values.

At block 206, logic flow 200 may perform a final peak width determination. In some embodiments, some, all, or substantially all FWHM values determined in block 204 may be saved to an array or other data structure, for example, that increases in size as new peak widths are added in real-time. This array may contain not just the number of peak widths computed in a single sequence of data points (for instance, a chromatogram, a mass spectrum, a driftogram, and/or the like), but all peak widths computed in as many sequence of data points of one type are in the entire data acquisition (for instance, all or substantially all chromatograms, spectrums, driftograms, and/or the like).

In some embodiments, the Gaussian curve fitting process assumes the Gaussian baseline is at zero intensity. If the underlying Gaussian represented by the data points has a baseline above zero, the curve fitting may overestimate the σ of the Gaussian with a correspondent overestimation of the FWHM of the peak. In various embodiments, if the baseline of the underlying Gaussian represented by the data points is known, it can be subtracted from the intensity of all points in the box before taking the log, for example, to correct the curve fitting a estimation. In some embodiments, baseline offset estimation logic 126 may operate a baseline offset estimation process to address this problem (see, for example, FIGS. 7-13).

In some embodiments, a baseline offset estimation process may use the data points passed to block 204 of logic flow 200, which should have an intensity above half the apex intensity (except the two end points that have an intensity just below half the apex intensity). In general, these data points represent the top part of a Gaussian curve, for example, as depicted in FIG. 5. In some embodiments, logic flow 200 may perform the baseline offset estimation process at block 250 just before block 204. Logic flow 200 may use the baseline offset estimation process to provide an estimated baseline offset at block 252 for the Gaussian curve fitting process of block 204.

In some examples, for a Gaussian curve with a baseline offset of zero intensity, the average intensity of the points with intensity equal or greater than half the apex intensity (the top part of the Gaussian) is about 81% of the apex intensity ("Gaussian top-part ratio"). However, when the baseline offset of the Gaussian curve is above zero, this percentage drops below about 81%. This property may be used to estimate the baseline offset according to some embodiments.

Figure 7:
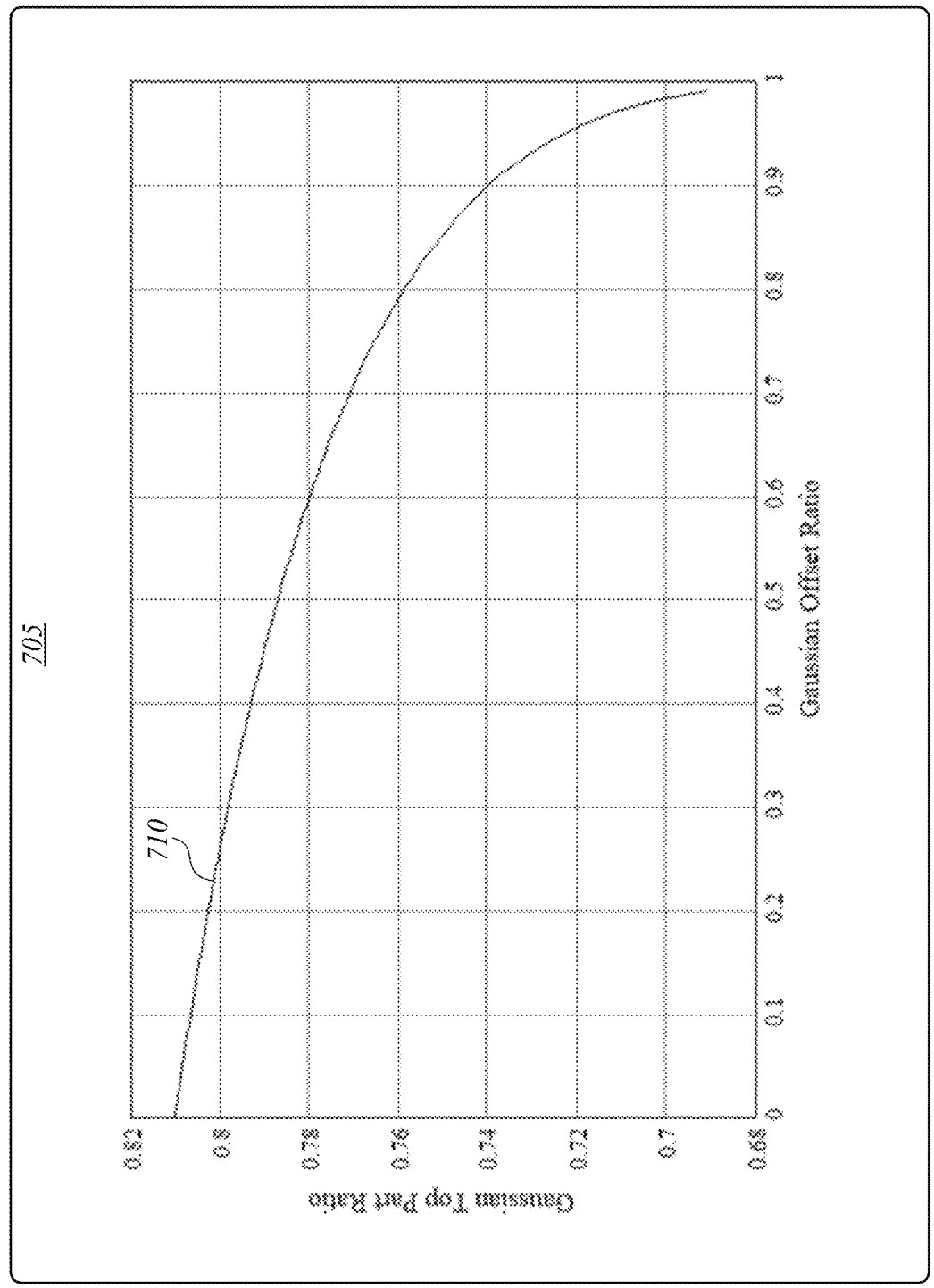
FIG. 7 illustrates a graph of Gaussian top-part ratio versus Gaussian offset ratio according to some embodiments.

FIG. 7 depicts the dependency of the Gaussian top-part ratio percentage, with the "Gaussian offset ratio," which is the ratio of the offset to the intensity of the apex without offset. Graph 705 shows the maximum offset that can be estimated using this method is less than 100% of the apex intensity without offset (for instance, a Gaussian offset ratio less than one).

Curve 710 may be expressed by the following curve equation, where "erf" is the error function, "ratio" is the Gaussian top-part Ratio, and "offset" is the Gaussian offset ratio:

$$ratio = \frac{\frac{\sqrt{\pi}}{2} \cdot \frac{erf\left(\sqrt{-\ln\left(\frac{1 - \text{offset}}{2}\right)}\right)}{\sqrt{-\ln\left(\frac{1 - \text{offset}}{2}\right)}} + \text{offset}}{1 + \text{offset}}$$

Finding the inverse function for determining the offset for a given ratio may be challenging and/or unnecessary. Accordingly, some embodiments may build a table (for example, a ratio-offset table) of ratio values for a finite number of offset values and use the table to look up the closest offset for a given ratio. This is sufficient for the purpose of finding an estimation of the Gaussian offset, and a table with a certain number of offset values (for example, 100 offset values, such as from 0 to 0.99 in increments of 0.01 (0% to 99% in increments of 1%), or any other rage and increment), may be sufficient for processes according to some embodiments. Other applications of this offset estimation algorithm may require a finer resolution table. The table may be built using the curve equation above to get a ratio value for each desired offset value in the table. For example, the following is a table with offset values in 0.1 increments:

TABLE 1

| offset | ratio |
|---|---|
| 0.0 | 0.810025 |
| 0.1 | 0.806483 |
| 0.2 | 0.802536 |
| 0.3 | 0.798083 |
| 0.4 | 0.792980 |
| 0.5 | 0.787010 |
| 0.6 | 0.779822 |
| 0.7 | 0.770784 |
| 0.8 | 0.758565 |
| 0.9 | 0.739299 |

Figure 8:
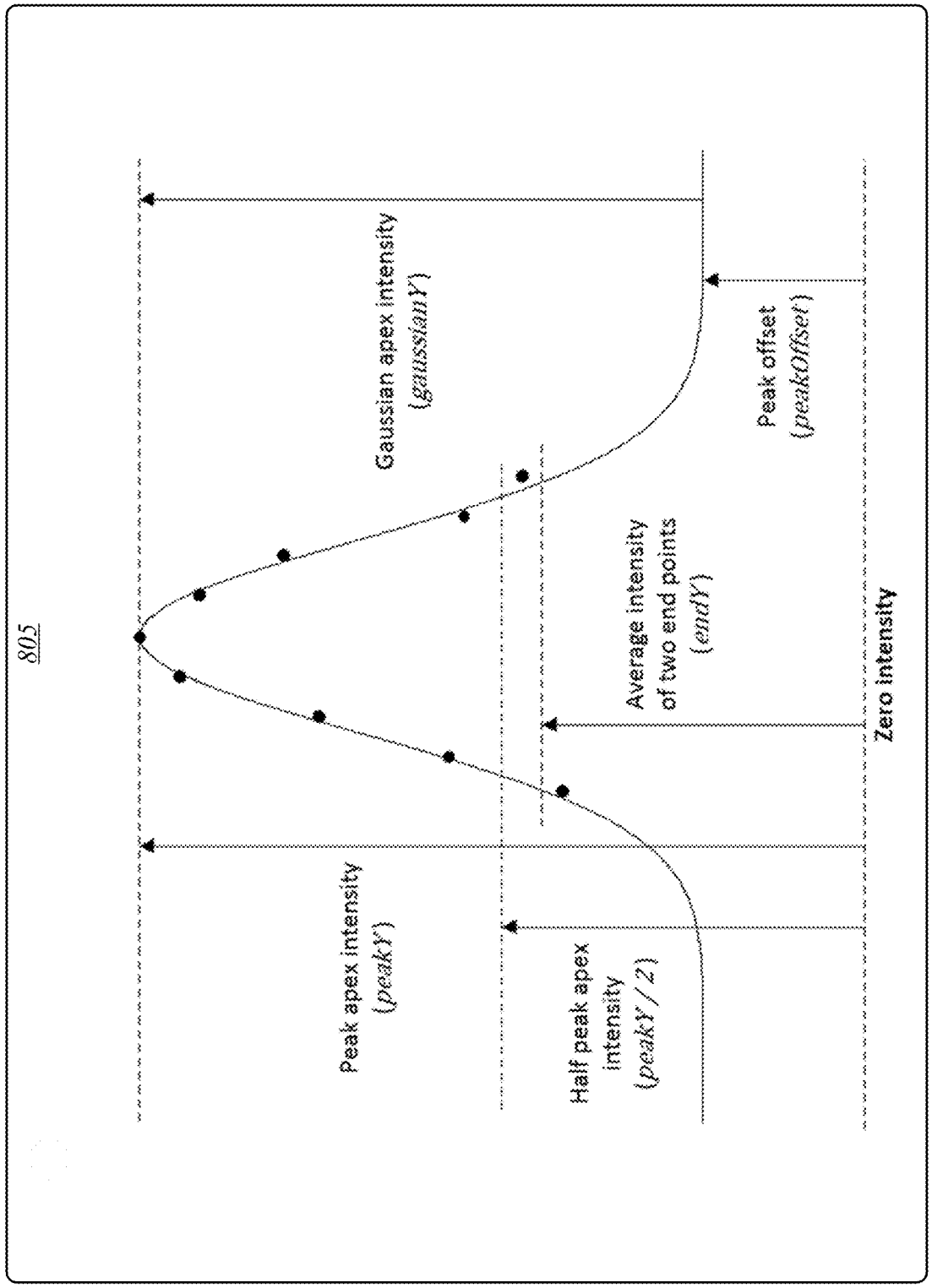
FIGS. 8-12 illustrate an exemplary set of data points for a baseline offset estimation process according to some embodiments.

FIG. 8 illustrates an exemplary set of data points for a baseline offset estimation process according to some embodiments. More specifically, graph 805 depicts an example of a sequence of data points, that may be passed to block 204 of logic flow 200, that depicts a Gaussian peak with an apex intensity peakY, which equals to a Gaussian intensity gaussianY plus a peak offset peakOffset. In this example, the Gaussian offset ratio of FIG. 7 may be determined by peakOffset/gaussianY.

As shown in FIG. 8, in some examples, the two end points in the sequence may have an intensity less than half the peak apex intensity (peakY/2), therefore the sequence of data points does not meet the requirement stated above that all points must have an intensity equal or greater than half the peak apex intensity to use them in the baseline offset estimation process. Accordingly, some embodiments may add some amount of positive shift to all points in the sequence in order to satisfy this requirement.

Figure 9:
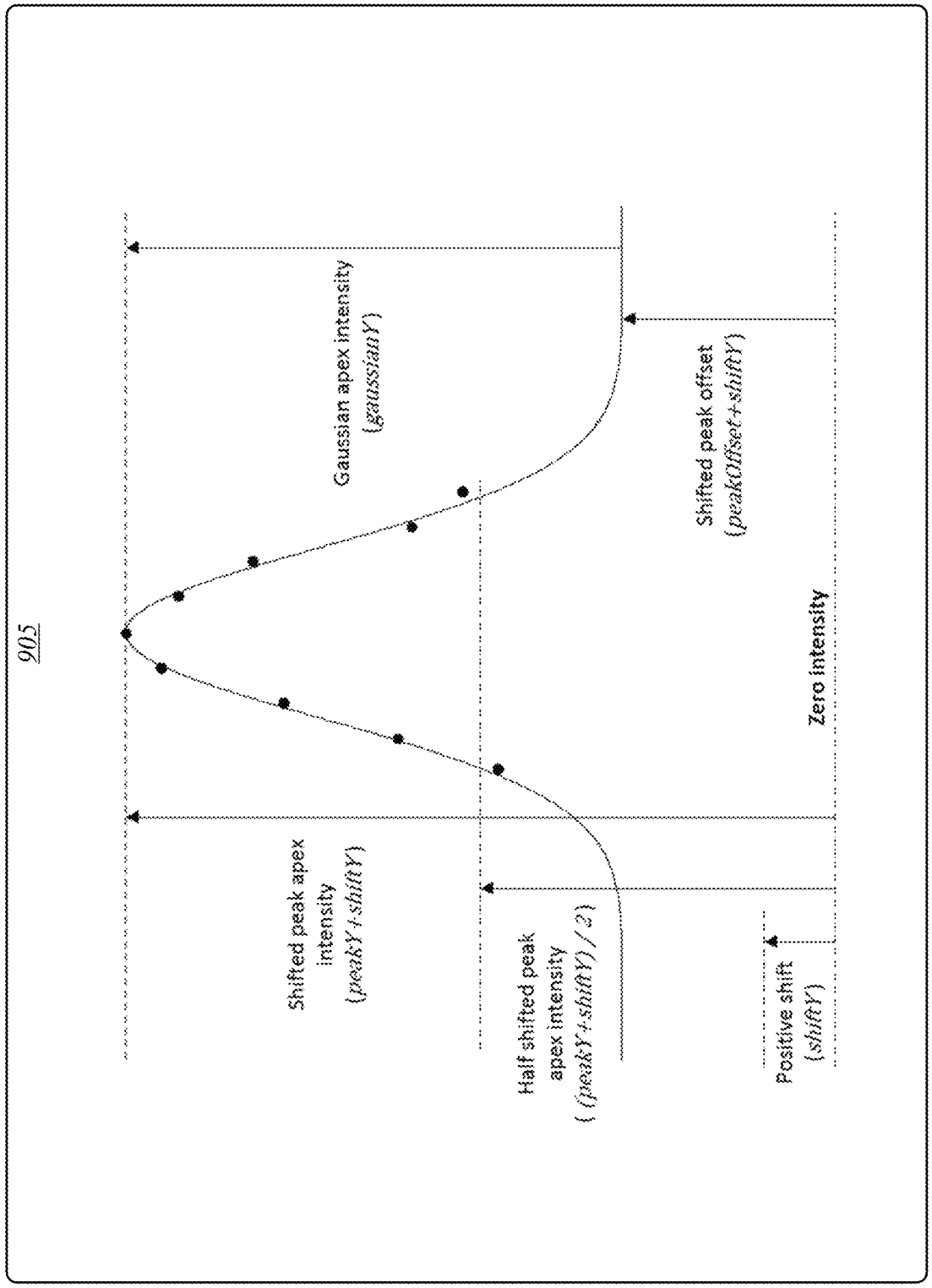

Unless both end points have the same intensity, adding the appropriate shift may make one of them sit exactly at half the shifted peak apex, and the other at a greater intensity. This results in an underestimation of the offset. Thus, a better approach may be to compute the amount of positive shift that would make the average of both shifted end points equal to half the shifted peak apex intensity. FIG. 9 illustrates an exemplary set of data points for a baseline offset estimation process according to some embodiments. More specifically, FIG. 9 depicts graph 905 with a sequence of data points in which shiftY is the positive shift added.

The amount of positive shift is computed with the following equation:

$$shiftY = peakY - 2 \cdot endY.$$

In some embodiments, the positive shift may be deducted from the estimated offset value at the end.

In various embodiments, the Gaussian top-part ratio of FIG. 7 may be the average intensity of the shifted points over the shifted peak apex intensity. This may expressed in the following equation, where N is the number of points in the sequence and P the intensity of each point:

$$ratio = \frac{\frac{1}{N} \cdot \sum_0^{N-1}(P_i + shiftY)}{peakY + shiftY}.$$

Using the ratio-offset table for the finite number of offset values, the baseline offset estimation process may look up the closest offset (for instance, Gaussian offset ratio of FIG. 7) for the computed ratio. In some embodiments, the values in this table may depend on the number of data points in the sequence. In various embodiments, a minimum number of data points may be required, for example, a minimum of about 1, about 5, about 10, about 20, about 50, about 100, about 1000 and/or the like. Therefore, in some embodiments, there may be a distinct table for each possible number of data points in the sequence, for example, starting with a table for sequences of five points.

With the offset value from the table, the estimated peak offset may be computed with the following equation:

$$peakOffset = offset \cdot \frac{peakY + shiftY}{offset + 1} - shiftY.$$

Figure 10:
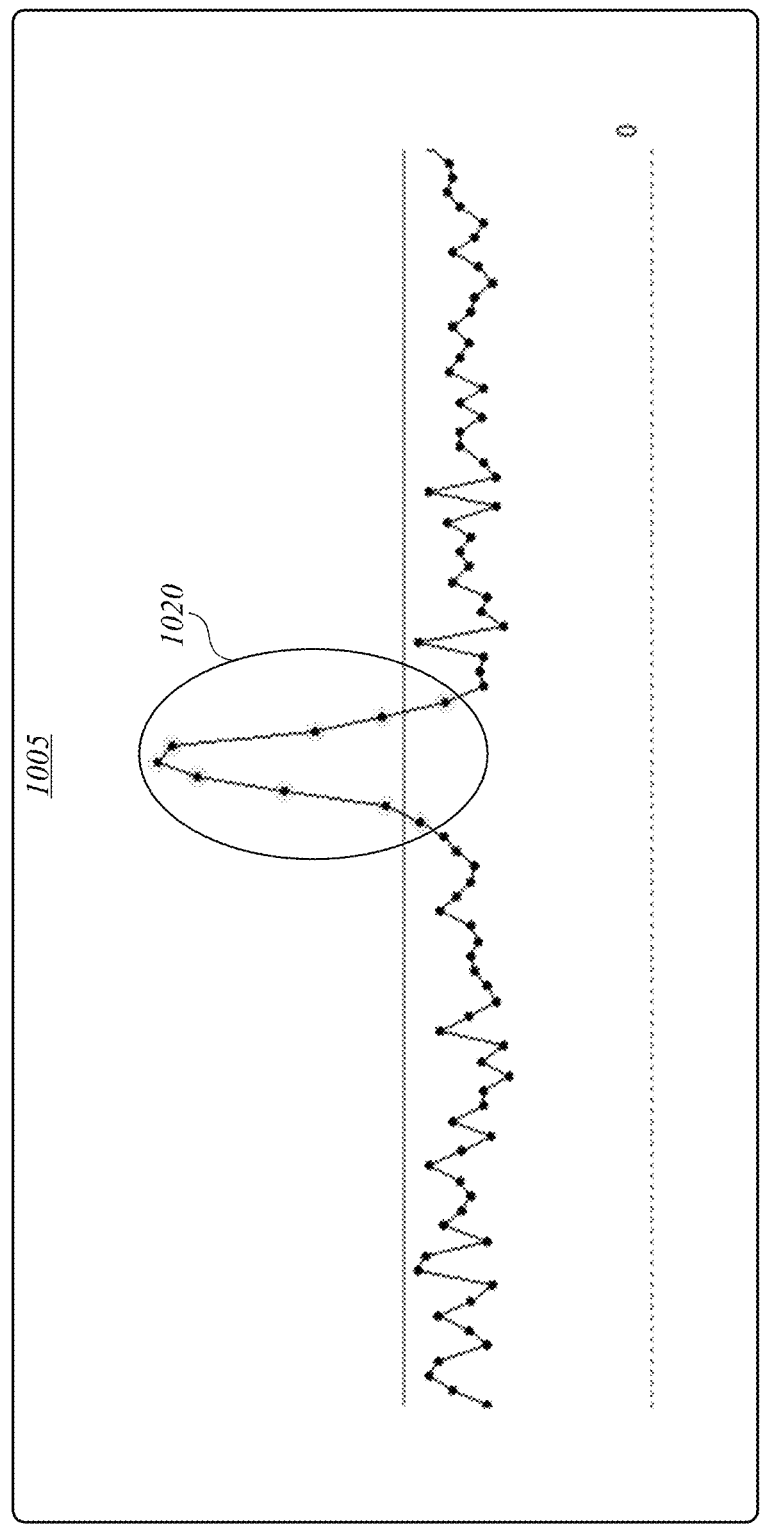
Figure 11:
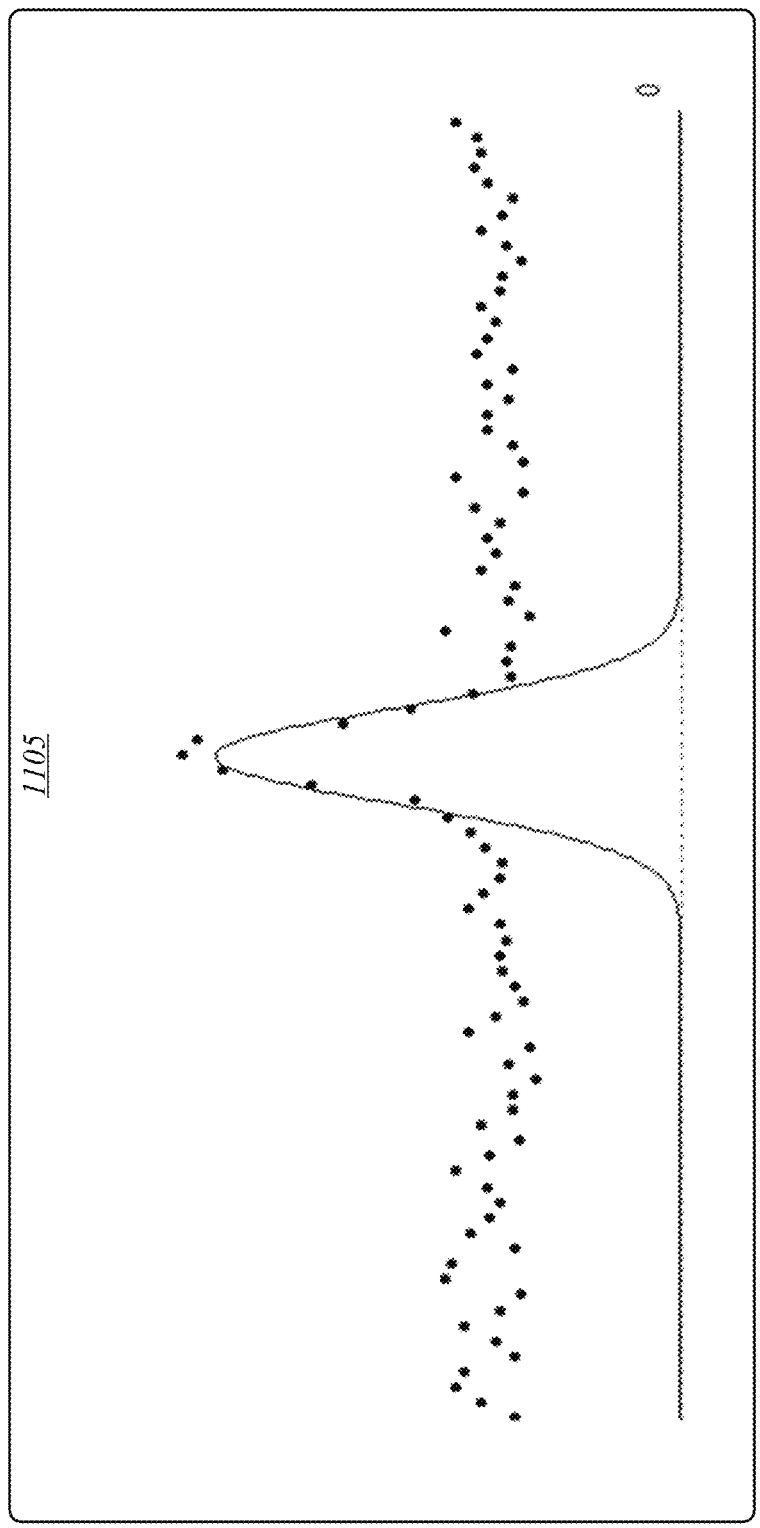
Figure 12:
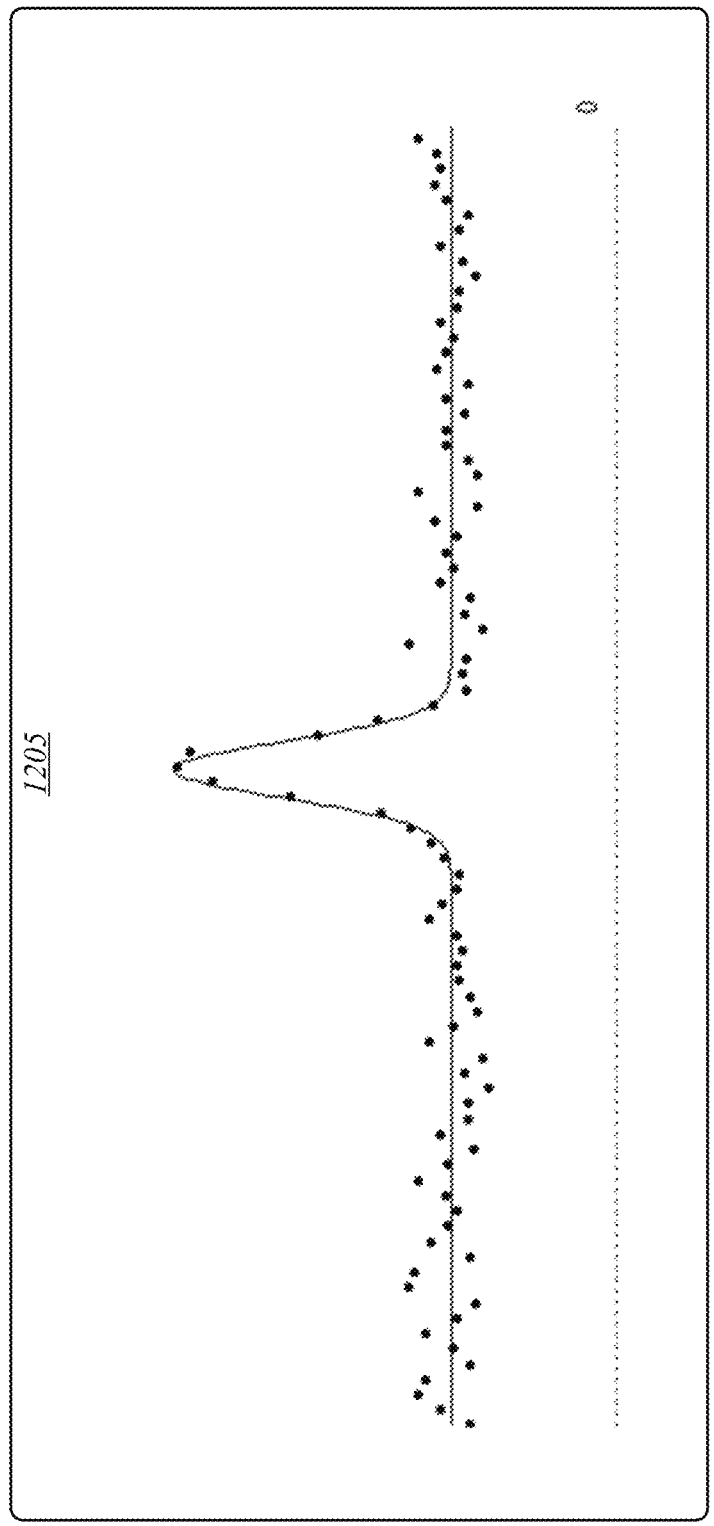

FIGS. 10-12 illustrate an exemplary set of data points for a baseline offset estimation process according to some embodiments. FIG. 10 depicts a graph 1005 of a sequence of noisy data points showing a peak and a relatively high baseline offset. Only the data points in circle 1020 may be used for peak width estimation (for instance, block 204 of logic flow 200). FIG. 11 depicts graph 1105 of the fitted Gaussian without baseline offset correction, and FIG. 12 depicts graph 1205 of the fitted Gaussian with baseline offset correction. The baseline offset estimation algorithm may be used in other applications different than the peak width computation algorithm. For example, any application that needs to estimate the offset value of a Gaussian curve and at least the top half of the curve is available, may use this algorithm to estimate the offset.

FIG. 13 illustrates an embodiment of a logic flow 1300. Logic flow 1300 may be representative of some or all of the operations executed by one or more embodiments described herein, such as computing device 110. In some embodiments, logic flow 1300 may be representative of some or all of the operations of an acquisition-stage peak width determination process performed via baseline offset estimation logic 126.

At block 1302, logic flow 1300 may collect the sequence of points of the Gaussian curve ($P_i$) that contains the top part. For example, the peak apex is the point with the maximum value (peakY) and is located near the middle of the sequence. The first and last points in the sequence are the points closest to the apex, and at both sides of the apex, which have a value less than or equal to half the apex value (peakY/2). The sequence constructed this way results in N number of points.

Logic flow 1300 may compute the average of the two end points (first and last points) in the sequence (endY) at block 1304.

At block 1306, logic flow 1300 may compute the amount of positive shift required (shiftY), for example, using the following equation:

$$shiftY = peakY - 2 \cdot endY.$$

At block 1308, logic flow 1300 may compute the Gaussian Top Part Ratio (ratio) as the average value of the shifted points over the shifted peak apex value using the following equation:

$$ratio = \frac{\frac{1}{N} \cdot \sum_0^{N-1}(P_i + shiftY)}{peakY + shiftY}.$$

At block 1310, logic flow 1300 may read the Gaussian Offset Ratio (offset) from the table of finite number of offset values using the computed ratio value. The table is specific for sequences of N points and is built with the number of offset values required by the application.

At block 1312, logic flow 1300 may compute the estimated Gaussian curve offset (peakOffset) using the offset value from the table and the following equation:

$$peakOffset = offset \cdot \frac{peakY + shiftY}{offset + 1} - shiftY.$$

Real-time processing of the data acquired may require an updated peak width value at different times during acquisition, for example, at a regular or substantially regular rate. The FWHM values contained at any given time in the array defined earlier, may be used to compute this updated, or "output," peak width value. The array may store the computed FWHM of the peak or other data structure to be used for example, preferably containing several FWHM values. For instance, this operation may be done at block 206 of logic flow 200.

A plurality of different processes for using the values in the array may be used. In a first non-limiting process, all peak width values in the array so far may be used ("accumulated peaks process"). The output peak width value is computed taking the mean, median, or mode (included weighted versions thereof) of all values in the array. Given that the number of peak width values contained in the array most likely increase as the acquisition progresses, the output peak width may evolve throughout the acquisition. Only output peak width values computed towards the end of the acquisition will take into consideration most, if not all, peak width values In a second non-limiting process, only the peak width values from the most intense peaks may be used ("most intense peaks process"). The values in the array may be sorted by peak intensity. Then, the output peak width value is computed taking the mean, median, or mode of only the peak widths of a number of the most intense peaks. With the most intense peaks process, low intensity peaks, which are the most affected by noise and a baseline above zero, do not contribute or do not substantially contribute to the output peak width determination. The output peak width may evolve throughout the acquisition, but once the majority of the most intense peaks have shown in the data, the output peak width may stay fairly constant for the rest of the acquisition.

In a third non-limiting process, only the peak width values from the most recent peaks may be used ("most recent peaks process"). The values in the array may be sorted by acquisition time. Then, the output peak width value may be computed taking the mean, median, or mode of only the peak widths of the most recent peaks. The most recent peaks may be those with an acquisition time that falls within certain past acquisition time window. The output peak width may evolve according with the peak content of the data, which might be very valuable for real-time data processing. If certain areas of the acquisition do not have a sufficient number of peaks, or no peaks at all, within the time window, a last output value computed may be used as the output peak width.

In a fourth non-limiting process, only the peak width values from the most intense and recent peaks may be used (for example, combining the most intense peaks process and most recent peaks process).

The array of peak width values may be sorted by retention time first to discard values coming from peaks older than the retention time history window, and the remaining values may be sorted by peak intensity. However, care must be taken to prevent this double requirement from excluding too many peaks, because the output peak width would be produced by few peak width values. Accordingly, such processes may provide at least one preferred method to compute the chromatographic output peak width according to some embodiments.

A way to prevent excluding too may peaks with this method may be to choose a lower threshold to allow using less intense peaks, but also setting a maximum limit in the number of peak widths that will be used.

For example, with a threshold of 100 counts, peaks with intensity greater than 100 counts are considered intense peaks. If there is a region of the data where the number of intense peaks is 7,000, the acquisition-stage peak width determination process may be using 7,000 peak width values to compute the output peak width. However, there might be another region of the data where the number of intense peaks is 300. In this region the acquisition-stage peak width determination process may be using only 300 peak width values to compute the output peak width.

Instead, the threshold may be lowered to a lower limit (for instance, 10 counts) and limit to the number of peak width values (for example, 1000 values) used to compute the output peak width. In the example depicted above, the number of intense peaks in the first region of the data would increase to, say 30,000, but the acquisition-stage peak width determination process may be using only the most intense 1,000. In the second region, the number of intense peaks would increase for example to 1,500, but the acquisition-stage peak width determination process may be using only the most intense 1,000. In this manner, the output peak width may be determined with the best data available at any given time.

Due to the disparity of the data, the chromatographic output peak width computed with this method, may show sudden variations over time. To minimize this and make it evolve smoother two enhancements can be used. First, the array of peak width values may be split into three sections. Given that the array of peak width values is sorted by peak intensity, one of the sections contains peak widths from the most intense peaks, other section contains peak widths from medium intensity peaks, and the third section contains peak widths from the least intense peaks. The acquisition-stage peak width determination process may then compute an output peak width value for each of the three sections and use the maximum of the three as the final output peak width. This prevents, in certain situations, the output peak width being biased by the peak width of a small number of intense peaks when most peak widths come from small or medium peaks.

It is possible to split the array of peak width values other than in three sections, but the benefit starts to decrease with more than three sections to the point that if split in many sections, the system would behave as if we were taking the maximum value of the array instead of the mean, median, or mode to compute the output peak width.

The second enhancement may be to smooth the evolution of the output peak width over time using, for example, an IIR (Infinite Impulse Response) smoothing filter. This can be a single or dual pole filter with a time constant linked to the retention time history window used, and that makes the filter settle within the window.

Figure 14:
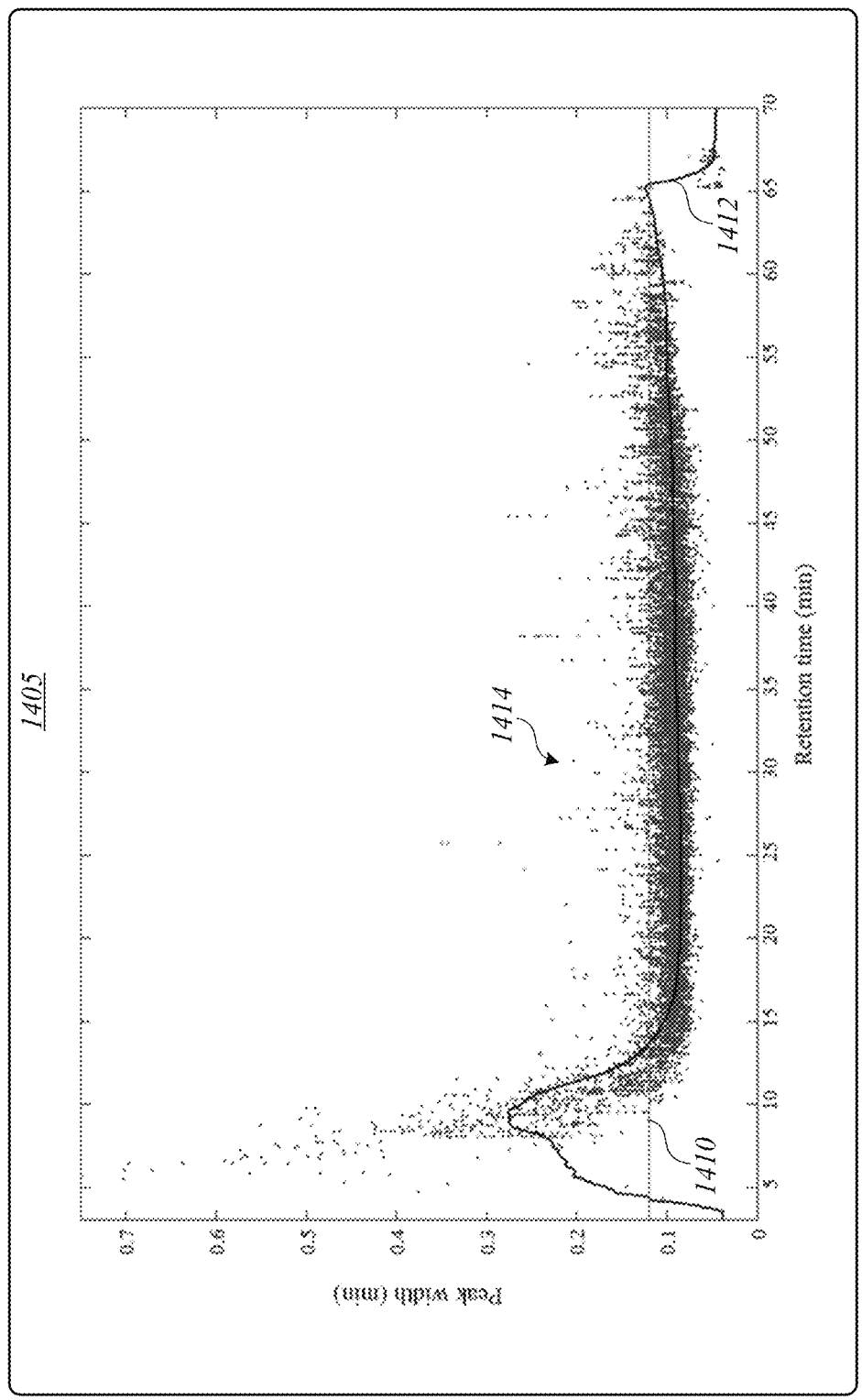
FIG. 14 depicts an example of real-time chromatographic peak width processing according to some embodiments.

FIG. 14 depicts an example of real-time chromatographic peak width processing according to some embodiments. Graph or plot 1405 shows chromatographic peak width over retention time in minutes, where the line 1412 is the real-time peak width value determined by the acquisition-stage peak width determination process, the line 1410 is the single peak width value determined by standard post-acquisition peak width algorithms, and the dots 1414 represent the actual peak width of individual peaks. It is visible in plot 1405 that the real-time peak width value 1412 follows the trend of dots 1414, while the line 1410 indicates an average value of all dots 1414.

Use Case:

An acquisition-stage peak width determination process according to the described embodiments may be used to determine peak width for one-dimensional or multi-dimensional data. For example, an acquisition-stage peak width determination process may be used to determine the peak width in each axis in MS three-dimensional data. As an example, from the data perspective, at any given acquisition sampling time there may be a set of 200 mass scans for 200 drift bins. All of these 200 scans may be "M" mass indices long and have the same acquisition time assigned.

For the mass axis, the peak width may be computed using the 200 scans as 200 individual sequences of data points according to some embodiments (for example, see FIGS. 2 and 4), and adding the width of all peaks found to the array of mass peak widths. The output mass peak width may be computed from the values in the array according to some embodiments. Given that the peak width in the mass axis varies with the mass index, the position of the Gaussian curve fitting, $X_{apex}$, may be used to determine the known variation of peak width with mass index, for instance, the mass resolution.

For the drift axis, a driftogram 200 data points long for each of the M mass index values in the 200 scans may be obtained. The peak width may be computed using the M driftograms as M individual sequences of data points as described earlier, and adding the width of all peaks found to the array of drift peak widths. The output drift peak width may be computed from the values in the array according to the described embodiments. Given that the peak width in the drift axis varies with the drift index, the position of the Gaussian curve fitting, Xapex, may be used to determine the linear variation of peak width with drift index.

For the chromatographic axis, a buffer of a number "S" of scan sets of 200 scans each may be determined. In some embodiments, the number of S scans may be determined by the widest expected chromatographic peak width. Once the S scan sets have been acquired, peak width computation may be initiated in the chromatographic axis using this volume of data. As the acquisition progresses, only the last S scan sets are kept in the buffer. In some embodiments, a chromatogram S data points long may be obtained for each of the 200×M indices (for instance, drift index by mass index) in the volume of data. The peak width may be computed using the 200×M chromatograms as 200×M individual sequences of data points according to described embodiments, and adding the width of all peaks found to the array of chromatographic peak widths. The output chromatographic peak width may be computed from the values in the array according to described embodiments. Alternately, if the volume of S×200×M data points is too big, the drift axis may be summed before saving the data, resulting in only S×M data points, leading to only M chromatograms.

Figure 15:
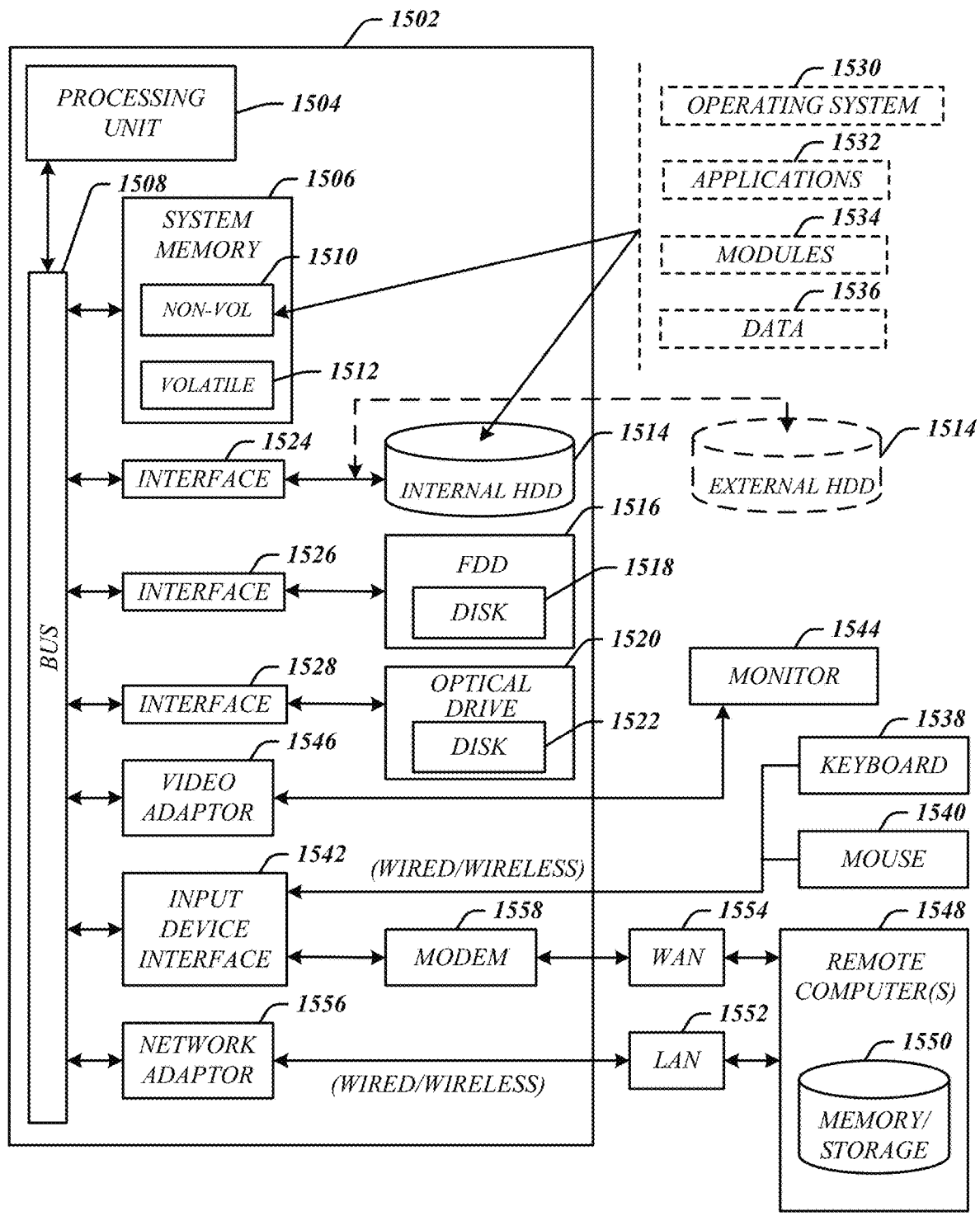
FIG. 15 illustrates an embodiment of a computing architecture.

FIG. 15 illustrates an embodiment of an exemplary computing architecture 1500 suitable for implementing various embodiments as previously described. In various embodiments, the computing architecture 1500 may include or be implemented as part of an electronic device. In some embodiments, the computing architecture 1500 may be representative, for example, of computing device 110. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1500.

As shown in FIG. 15, the computing architecture 1500 comprises a processing unit 1504, a system memory 1506 and a system bus 1508. The processing unit 1504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1504.

The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures. Interface adapters may connect to the system bus 1508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal (or external) hard disk drive (HDD) 1515, a magnetic floppy disk drive (FDD) 1516 to read from or write to a removable magnetic disk 15115, and an optical disk drive 1520 to read from or write to a removable optical disk 1522 (e.g., a CD-ROM or DVD). The HDD 1515, FDD 1516 and optical disk drive 1520 can be connected to the system bus 1508 by a HDD interface 1524, an FDD interface 1526 and an optical drive interface 1522, respectively. The HDD interface 1524 for external drive implementations can include at least one or both of Universal Serial Bus (USB) and IEEE 1374 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536. In one embodiment, the one or more application programs 1532, other program modules 1534, and program data 1536 can include, for example, the various applications and/or components of analysis system 105.

A user can enter commands and information into the computer 1502 through one or more wire/wireless input devices, for example, a keyboard 1538 and a pointing device, such as a mouse 1540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1504 through an input device interface 1542 that is coupled to the system bus 1508, but can be connected by other interfaces such as a parallel port, IEEE 1394 serial port, a game port, a USB port, an IR interface, and so forth.

A monitor 1544 or other type of display device is also connected to the system bus 1508 via an interface, such as a video adaptor 1546. The monitor 1544 may be internal or external to the computer 802. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   at least one memory; and
   logic coupled to the at least one memory to determine acquisition-stage peak width information, the logic to:
      detect a plurality of acquisition-stage peaks representing peaks in a sequence of data points acquired by a mass analyzer and perform rough peak width estimation per peak,
      generate an estimated peak width per peak, and
      determine a final peak width based on the estimated peak width per peak.

2. An apparatus, comprising:
   at least one memory; and
   logic coupled to the at least one memory, the logic to implement an acquisition-stage peak width determination process operative to:
      access acquisition-stage analytical information comprising at least one sequence of data points,
      determine a peak data point associated based on the peak data point meeting a plurality of acquisition-stage conditions, and
      determine the acquisition-stage peak width associated with the peak data point.

3. The apparatus of claim 2, the acquisition-stage analytical information comprising multi-dimensional data, each dimension of the multi-dimensional data representing a data stream associated with a type of acquisition, the logic to implement the acquisition-stage peak width determination process separately on each dimension of the multi-dimensional data.

4. The apparatus of claim 2, the at least one sequence of data points having a Gaussian profile.

5. The apparatus of claim 2, the plurality of acquisition-stage conditions comprising a first set of conditions to determine a peak apex and a second set of conditions to determine an estimation of full width at half maximum (FWHM).

6. The apparatus of claim 2, the plurality of acquisition-stage conditions comprising the following:

$P_C > \text{Intensity}_{min}$, $P_H > P_{L-1}$, $P_L > P_{H+1}$, $2P_L < P_C$, $2P_H < P_C$, $2P_{L+1} \geq P_C$, and $2P_{H-1} \geq P_C$, wherein $P_C$ is the intensity at the center point of a subset of the at least one sequence of data points, $P_L$ is the intensity at the first or lowest point of said subset, $P_H$ is the intensity at the last or highest point of said subset, $P_{L+1}$ is the intensity at the point immediately after point $P_L$, $P_{H-1}$ is the intensity at the point immediately before point $P_H$, and $\text{Intensity}_{min}$ is a minimum intensity threshold.

7. The apparatus of claim 2, the logic to filter the at least one sequence of data points using a box filter process.

8. The apparatus of claim 2, the logic to determine a filtered sequence of data points during filtering of the at least one sequence of data points.

9. The apparatus of claim 8, the logic to determine at least one peak width estimation per peak based on the filtered sequence of data points.

10. The apparatus of claim 9, the logic to determine the at least one peak width estimation by generating a best-fit Gaussian curve for the filtered sequence of data points and estimating the peak width as the full width at half maximum (FWHM) of the best-fit Gaussian curve.

11. The apparatus of claim 10, the logic to determine an output peak width based on the at least one peak width estimation.

12. The apparatus of claim 11, the logic to determine the output peak width based on the mean, median, or mode of a plurality of peak widths.

13. The apparatus of claim 12, the plurality of peak widths comprising at least one of: peaks accumulated at a specified point during acquisition, most intense peaks, or most recent peaks.

14. A method to implement an acquisition-stage peak width determination process, the method comprising:
   accessing acquisition-stage analytical information comprising at least one sequence of data points;
   determining a peak data point associated based on the peak data point meeting a plurality of acquisition-stage conditions; and
   determining the acquisition-stage peak width associated with the peak data point.

15. The method of claim 14, the acquisition-stage analytical information comprising multi-dimensional data, each dimension of the multi-dimensional data representing a data stream associated with a type of acquisition, the logic to implement the acquisition-stage peak width determination process separately on each dimension of the multi-dimensional data.

16. The method of claim 14, the at least one sequence of data points having a Gaussian profile.

17. The method of claim 14, the plurality of acquisition-stage conditions comprising a first set of conditions to determine a peak apex and a second set of conditions to determine an estimation of full width at half maximum (FWHM).

18. The method of claim 14, the plurality of acquisition-stage conditions comprising the following:

$P_C > \text{Intensity}_{min}$, $P_H > P_{L-1}$, $P_L > P_{H+1}$, $2P_L < P_C$, $2P_H < P_C$, $2P_{L+1} \geq P_C$, and $2P_{H-1} \geq P_C$, wherein $P_C$ is the intensity at the center point of a subset of the at least one sequence of data points, $P_L$ is the intensity at the first or lowest point of said subset, $P_H$ is the intensity at the last or highest point of said subset, $P_{L+1}$ is the intensity at the point immediately after point $P_L$, $P_{H-1}$ is the intensity at the point immediately before point $P_H$, and Intensity$_{min}$ is a minimum intensity threshold.

19. The method of claim 14, comprising filtering the at least one sequence of data points using a box filter process.

20. The method of claim 14, comprising determining a filtered sequence of data points during filtering of the at least one sequence of data points.

21. The method of claim 20, comprising determining at least one peak width estimation per peak based on the filtered sequence of data points.

22. The method of claim 21, comprising determining the at least one the peak width estimation by generating a best-fit Gaussian curve for the filtered sequence of data points and estimating the peak width as the full width at half maximum (FWHM) of the best-fit Gaussian curve.

23. The method of claim 22, comprising determining an output peak width based on the at least one peak width estimation.

24. The method of claim 23, comprising determining the output peak width based on the mean, median, or mode of a plurality of peak widths.

25. The method of claim 24, the plurality of peak widths comprising at least one of: peaks accumulated at a specified point during acquisition, most intense peaks, or most recent peaks.

26. An apparatus, comprising:
at least one memory; and
logic coupled to the at least one memory, the logic operative to implement a baseline offset estimation process operative to:
  determine a Gaussian curve having an apex intensity peakY that equals a Gaussian intensity plus a peak offset intensity peakOffset,
  determine a sequence of N data points of the Gaussian curve, comprising an apex point and adjacent points with an intensity greater than or equal to half the apex intensity,
  determine a table of a plurality of Gaussian top-part ratio values, wherein each of the plurality of Gaussian top-part ratio values corresponds with a Gaussian offset ratio value,
  determine a Gaussian top-part ratio value based on an average intensity of the sequence of N data points over the apex intensity,
  determine a Gaussian offset ratio value based on the Gaussian top-part ratio value and the table.

27. The apparatus of claim 26, the logic operative to determine the peak offset intensity based on the Gaussian offset ratio value offset and the apex intensity according to the following:

$$peakOffset = \text{offset} \cdot \frac{peakY}{\text{offset} + 1}.$$

28. The apparatus of claim 26, the logic operative to:
determine an intensity shift value shiftY to add to each of the sequence of data points,
determine the Gaussian top-part ratio value based on an average intensity of the sequence of shifted data points over the shifted apex intensity,
determine the peak offset intensity based on the Gaussian offset ratio value offset, the apex intensity, and the intensity shift value according to the following:

$$peakOffset = \text{offset} \cdot \frac{peakY + shiftY}{\text{offset} + 1} - shiftY.$$

29. The apparatus of claim 28, the logic operative to determine the intensity shift value via:
including in the sequence of N data points at least two endpoints having an intensity below half the apex intensity, wherein the two end points occupy the first and last positions in the sequence of N data points and have an average intensity endY,
determining a positive intensity shift value based on an average of at least two shifted endpoints being equal to half a shifted apex intensity according to the following:

shiftY=peakY−2·endY.

30. The apparatus of claim 26, the logic operative to determine the Gaussian offset ratio from the Gaussian top-part ratio based on the inverse of the following:

$$ratio = \frac{\frac{\sqrt{\pi}}{2} \cdot \frac{erf\left(\sqrt{-\ln\left(\frac{1 - \text{offset}}{2}\right)}\right)}{\sqrt{-\ln\left(\frac{1 - \text{offset}}{2}\right)}} + \text{offset}}{1 + \text{offset}}.$$

* * * * *